US010523483B2

(12) United States Patent
Noh et al.

(10) Patent No.: US 10,523,483 B2
(45) Date of Patent: Dec. 31, 2019

(54) SUPPORT OF FREQUENCY DIVERSITY MODE FOR BLOCK CODE BASED TRANSMISSION IN OFDMA

(71) Applicant: Newracom, Inc., Irvine, CA (US)

(72) Inventors: Yujin Noh, Irvine, CA (US); Dae Won Lee, Irvine, CA (US); Sungho Moon, Irvine, CA (US); Jae Hyun Ahn, Irvine, CA (US); Hee Jung Yu, Daejeon (KR); Minho Cheong, Irvine, CA (US)

(73) Assignee: NEWRACOM, INC., Lake Forest, CA (US)

( * ) Notice: Subject to any disclaimer, the term of this patent is extended or adjusted under 35 U.S.C. 154(b) by 0 days.

(21) Appl. No.: 15/859,192

(22) Filed: Dec. 29, 2017

(65) Prior Publication Data
US 2018/0123844 A1   May 3, 2018

Related U.S. Application Data

(63) Continuation of application No. 15/047,488, filed on Feb. 18, 2016, now Pat. No. 9,860,099.
(Continued)

(51) Int. Cl.
*H04B 7/12* (2006.01)
*H04L 27/26* (2006.01)
(Continued)

(52) U.S. Cl.
CPC ......... *H04L 27/2602* (2013.01); *H04B 7/068* (2013.01); *H04B 7/12* (2013.01);
(Continued)

(58) Field of Classification Search
None
See application file for complete search history.

(56) References Cited

U.S. PATENT DOCUMENTS 9,847,896 B2 * 12/2017 Azizi ................. H04L 27/2613
370/328
9,860,099 B1 * 1/2018 Noh .................... H04L 27/2602
370/328
(Continued)

OTHER PUBLICATIONS

"Part 11: Wireless LAN Medium Access Control (MAC) and Physical Layer (PHY) Specifications", IEEE Standards 802.11™-2012 (Revision of IEEE Standard 802.11-2007), Mar. 29, 2012, pp. 1-2695, IEEE (The Institute of Electrical and Electronic Engineers, Inc.), New York, NY, USA.
(Continued)

*Primary Examiner* — Anh Vu H Ly

(57) ABSTRACT

Transmitting a frame may include determining a numerology according to a channel bandwidth, indicating the numerology in a field of a frame, and transmitting the frame using the numerology. Receiving a frame may include receiving a preamble of a frame, determining a numerology using the preamble, and receiving later portions of the frame using the numerology. Transmitting a frame may include, for a transmission time slot, determining a value of a first subcarrier of a first Space-Time Stream (STS), determining a value of a second subcarrier of the first STS, and determining, according to complex conjugates or negative complex conjugates of the values of the first and second subcarriers of the first STS, respective values of second and first sub carriers of a second STS. Transmitting a constellation point of a frame may be performed using an orphan subcarrier pair.

12 Claims, 13 Drawing Sheets

Related U.S. Application Data

(60) Provisional application No. 62/117,901, filed on Feb. 18, 2015.

(51) Int. Cl.
*H04B 7/06* (2006.01)
*H04L 1/06* (2006.01)
*H04L 5/00* (2006.01)

(52) U.S. Cl.
CPC .............. *H04L 1/06* (2013.01); *H04L 1/0606* (2013.01); *H04L 5/0023* (2013.01); *H04L 27/2626* (2013.01); *H04L 27/2647* (2013.01); *H04L 5/0048* (2013.01)

(56) References Cited

U.S. PATENT DOCUMENTS

| | | | | |
|---|---|---|---|---|
| 2005/0078707 | A1* | 4/2005 | Maltsev | H04L 5/0053 370/471 |
| 2008/0043866 | A1* | 2/2008 | Mujtaba | H04L 27/2628 375/260 |
| 2011/0103406 | A1* | 5/2011 | Cai | H04L 5/0044 370/480 |
| 2013/0250953 | A1* | 9/2013 | Hui | H04B 3/54 370/392 |
| 2016/0073409 | A1* | 3/2016 | Chen | H04L 5/0037 370/329 |
| 2016/0227533 | A1* | 8/2016 | Josiam | H04W 74/006 370/392 |
| 2017/0046711 | A1* | 2/2017 | Dai | G06Q 20/40 370/328 |
| 2017/0272295 | A1* | 9/2017 | Lee | H04L 5/00 370/392 |

OTHER PUBLICATIONS

"Part 11: Wireless LAN Medium Access Control (MAC) and Physical Layer (PHY) Specifications, Amendment 4: Enhancements for Very High Throughput for Operation in Bands below 6 GHz", IEEE Standards 802.11ac™-2013, 2013, pp. 1-395, IEEE (The Institute of Electrical and Electronic Engineers, Inc.), New York, NY, USA.

"Part 11: Wireless LAN Medium Access Control (MAC) and Physical Layer (PHY) Specifications, Amendment 2: Sub 1 GHz License Exempt Operation", IEEE P802.11ah™/D5.0, Mar. 2015, pp. 1-604, IEEE (The Institute of Electrical and Electronic Engineers, Inc.), New York, NY, USA.

* cited by examiner

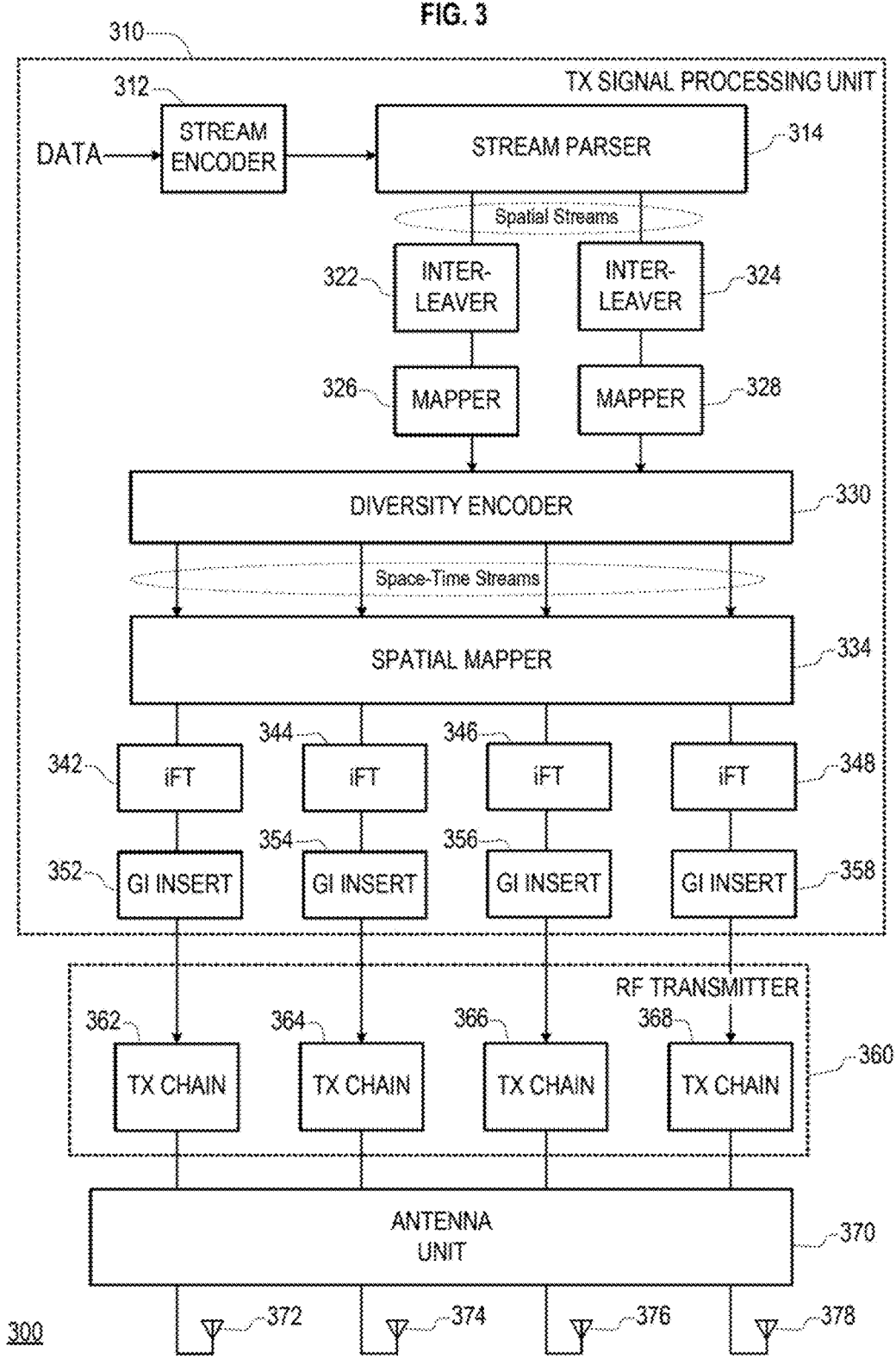

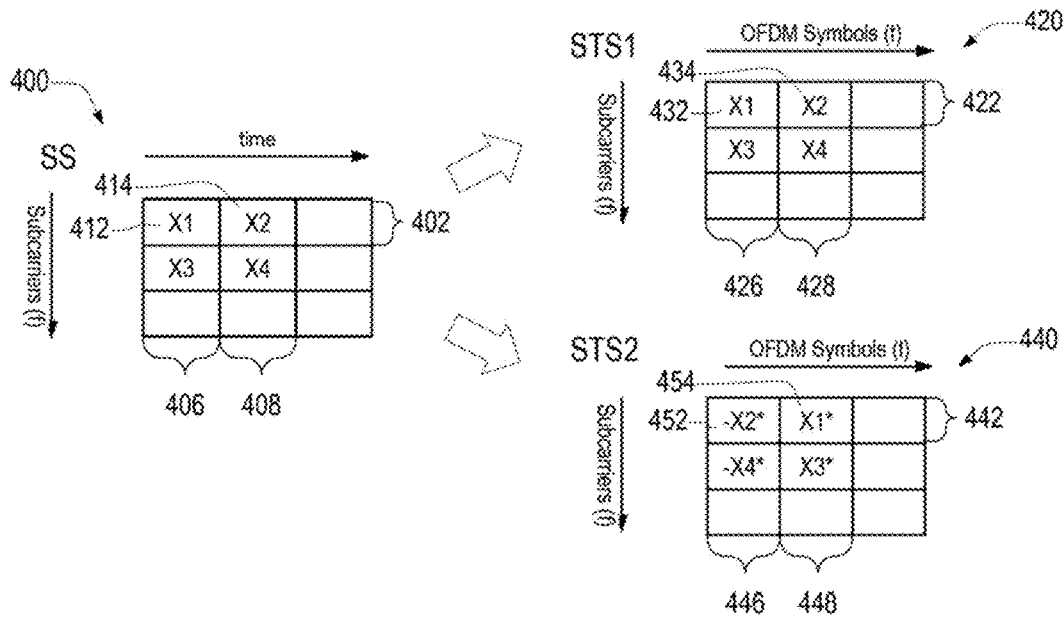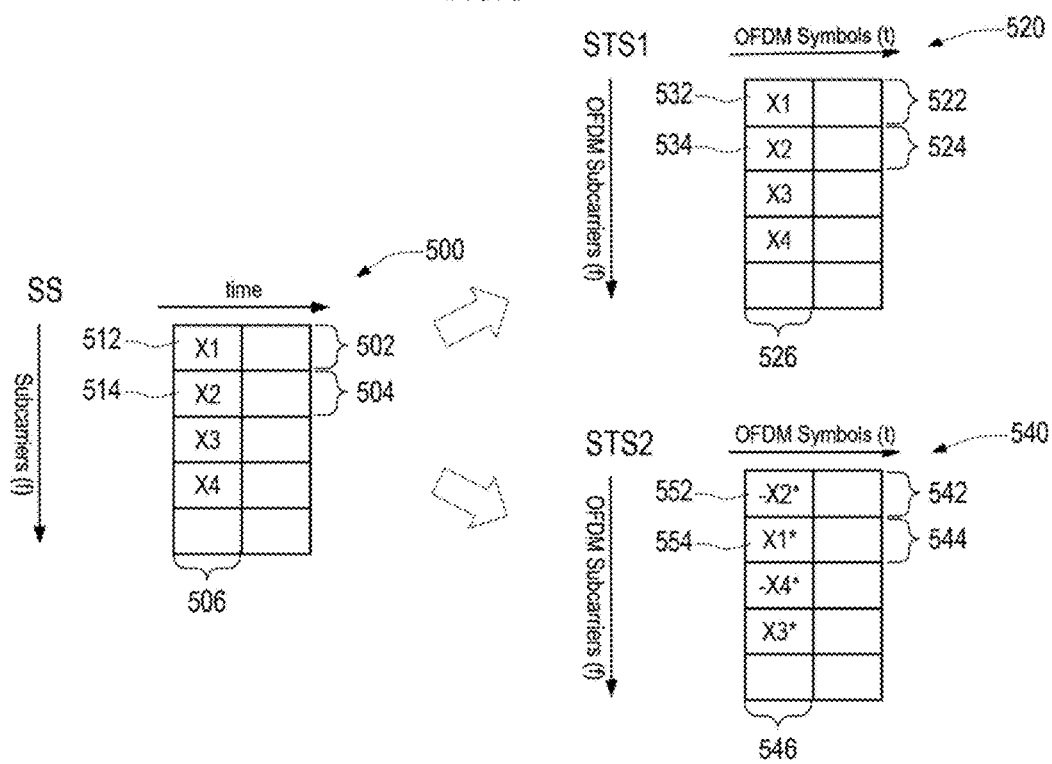

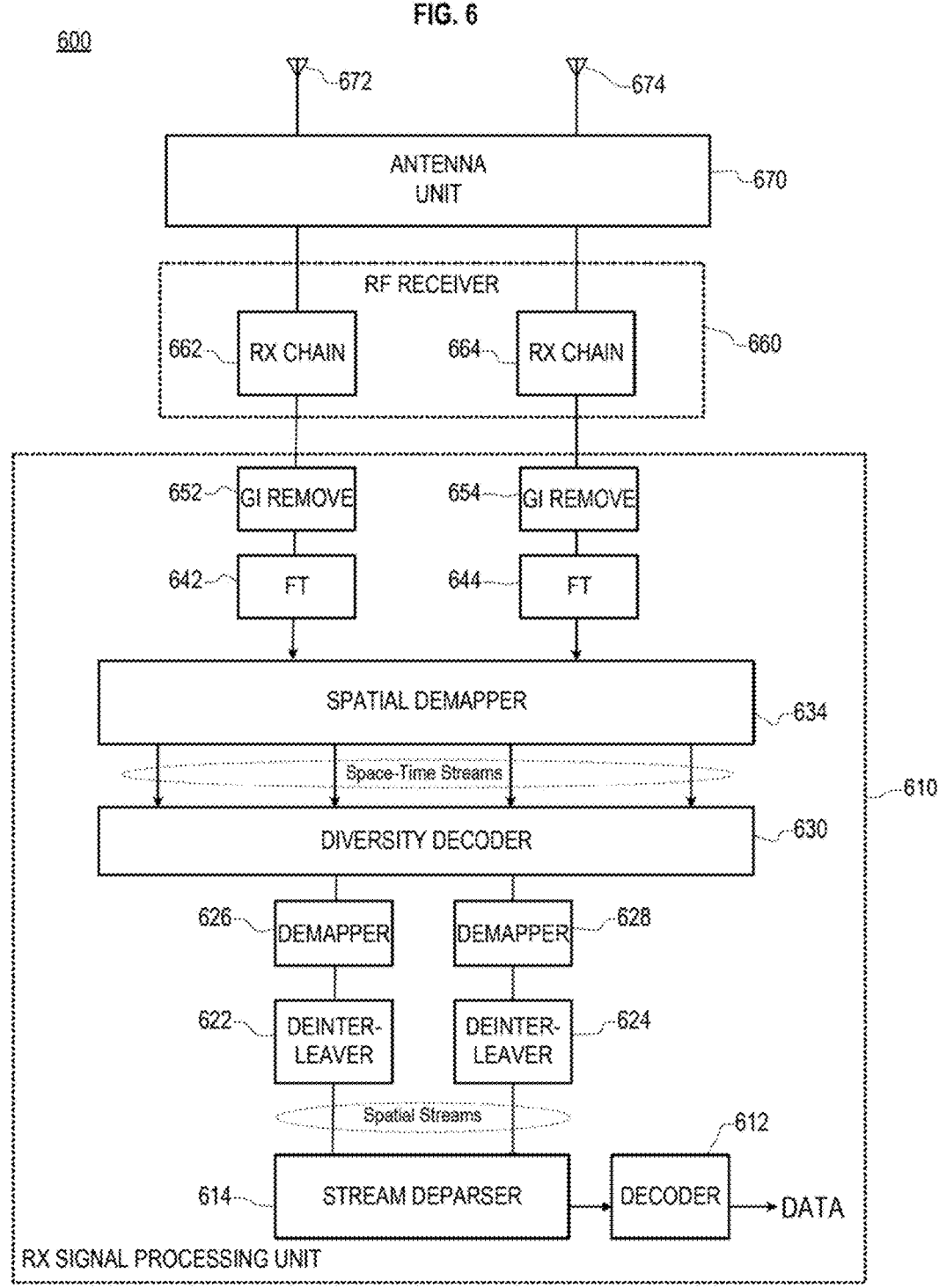

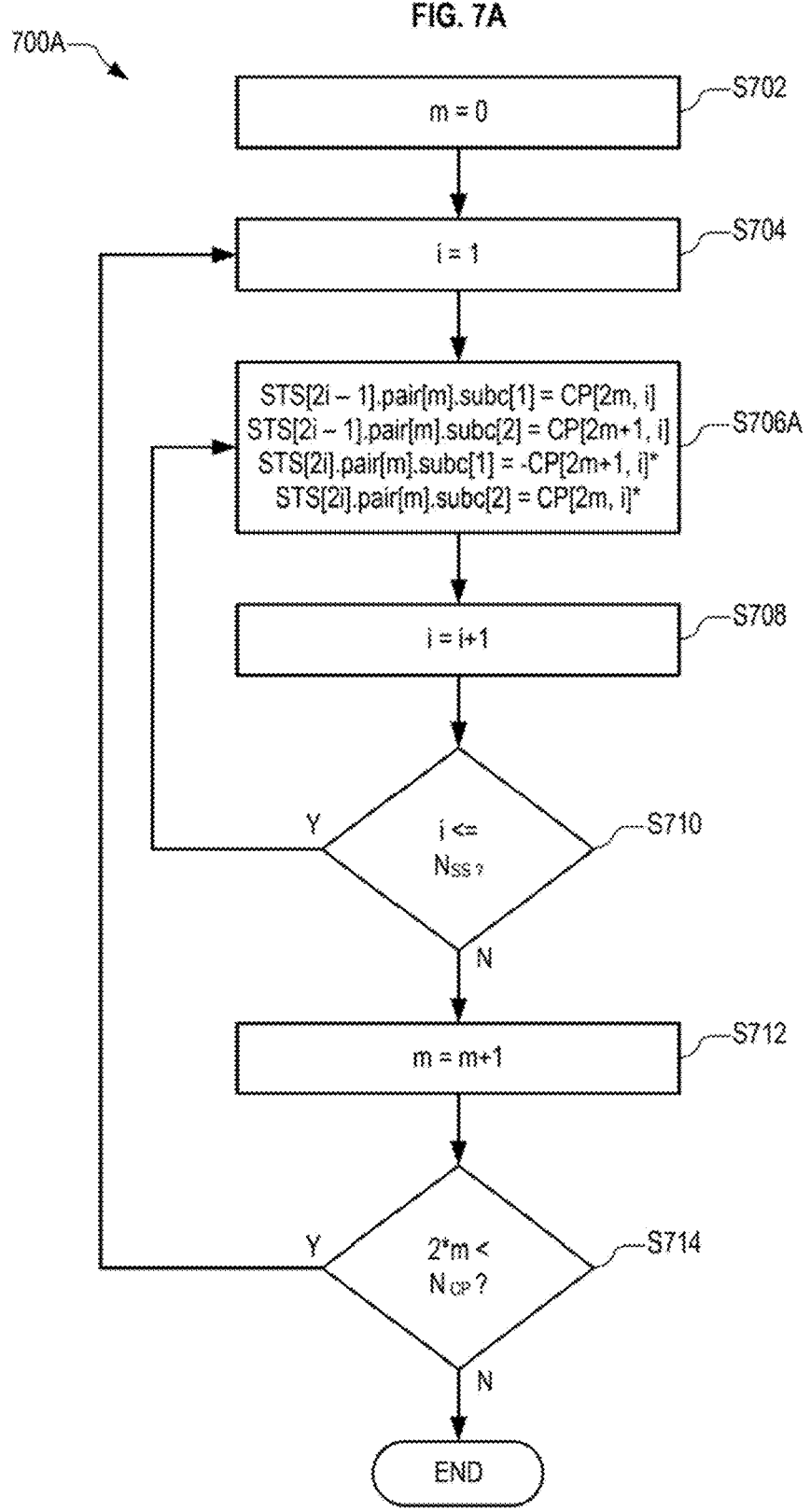

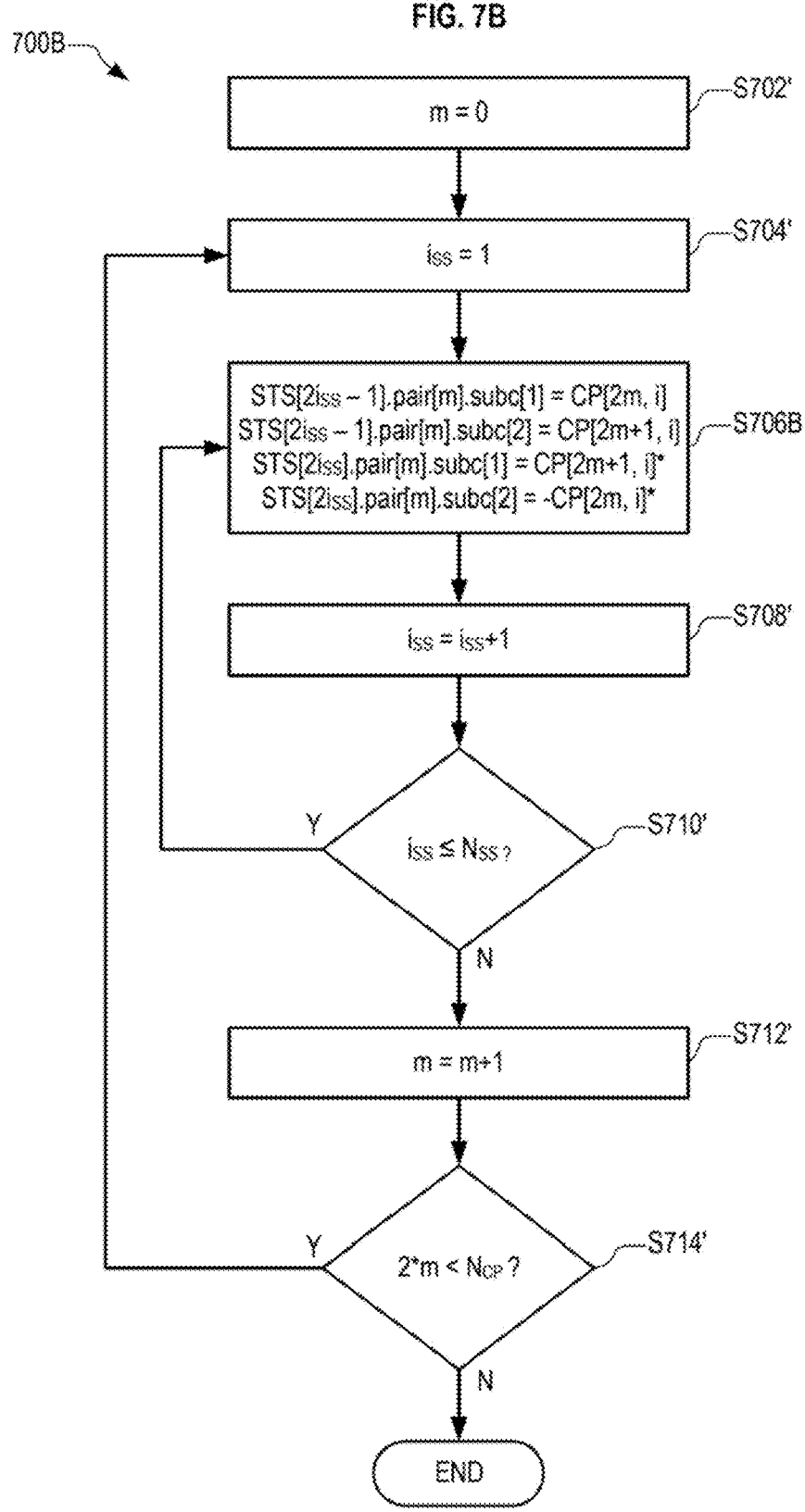

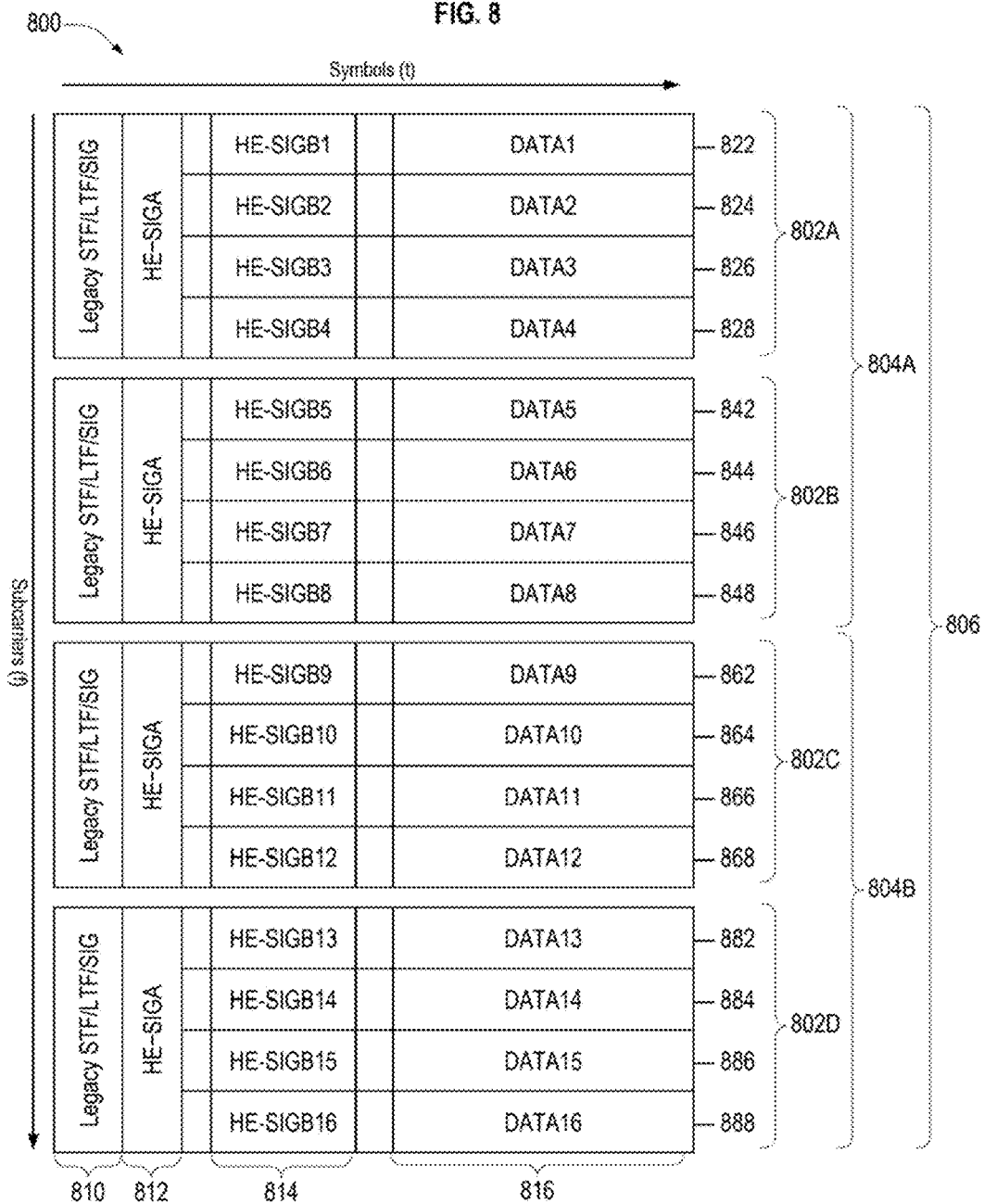

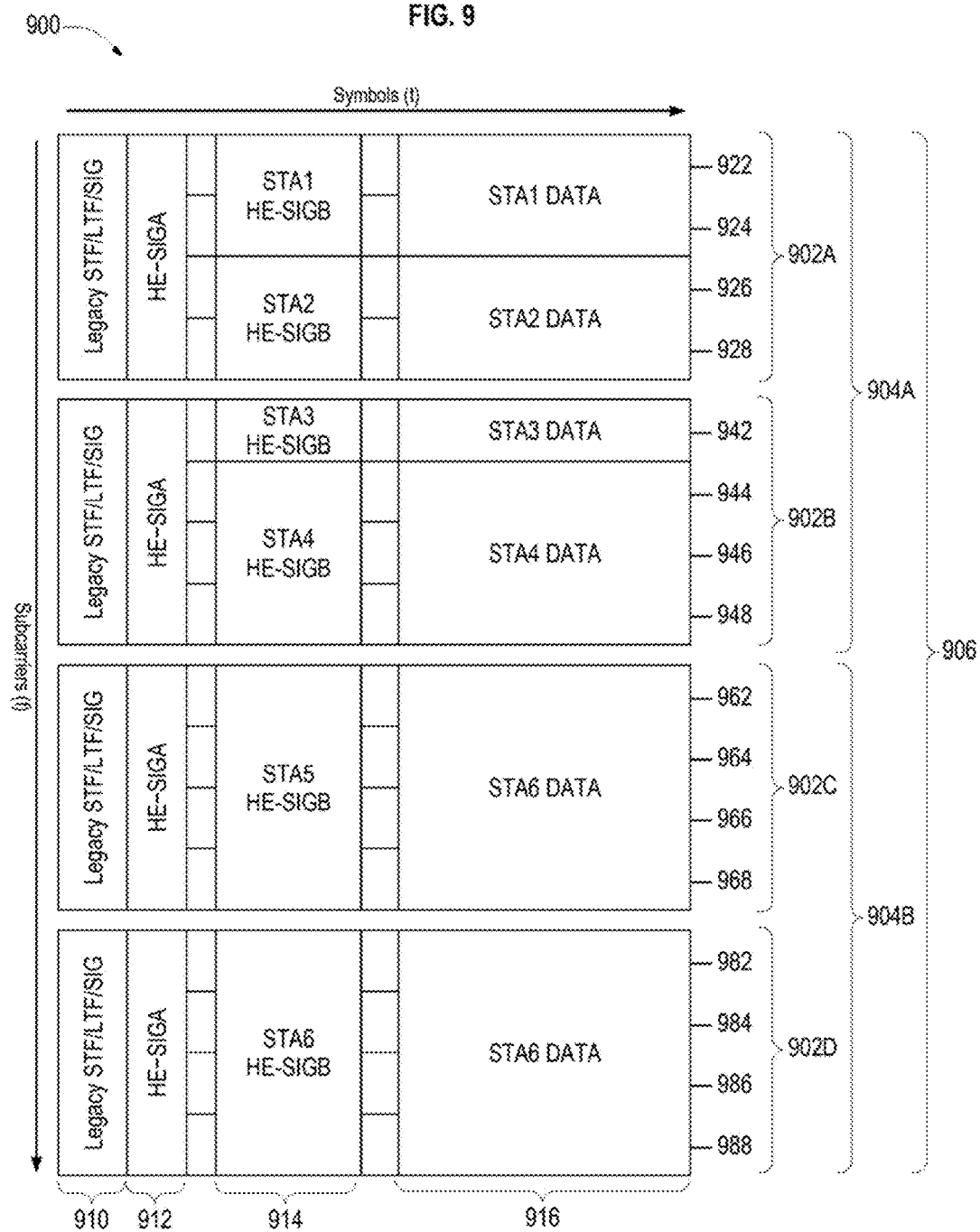

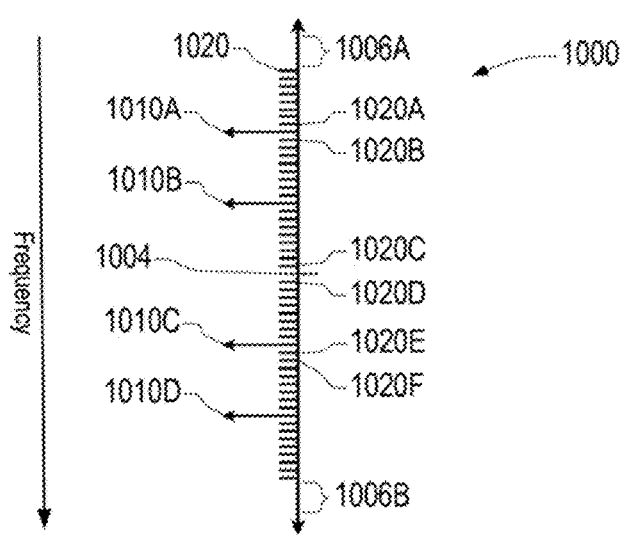

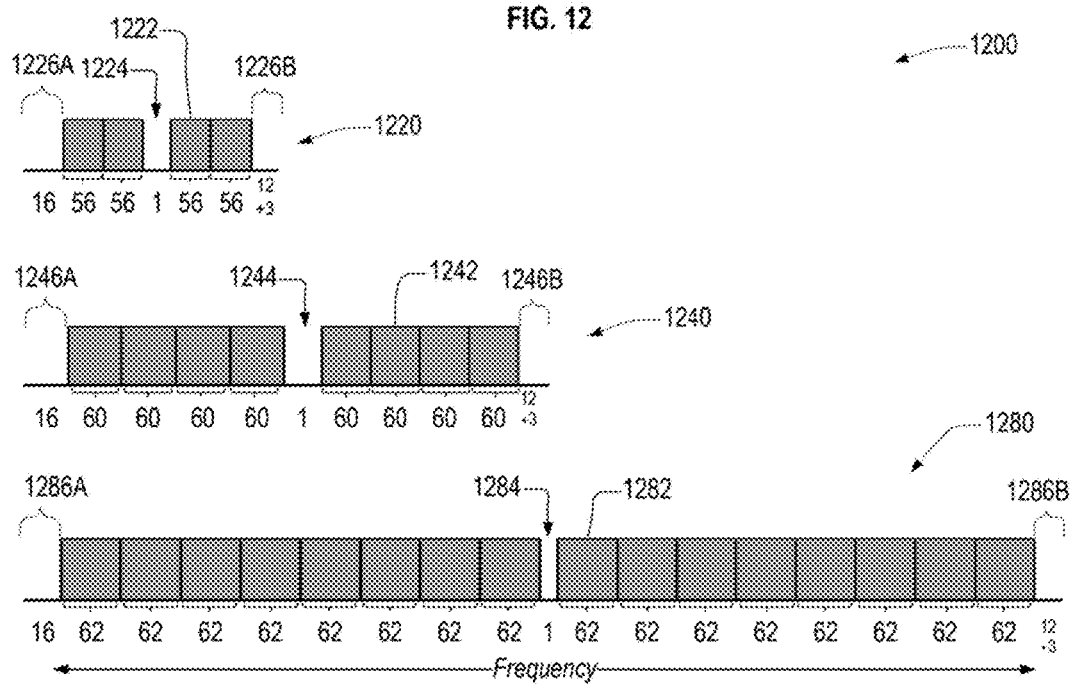
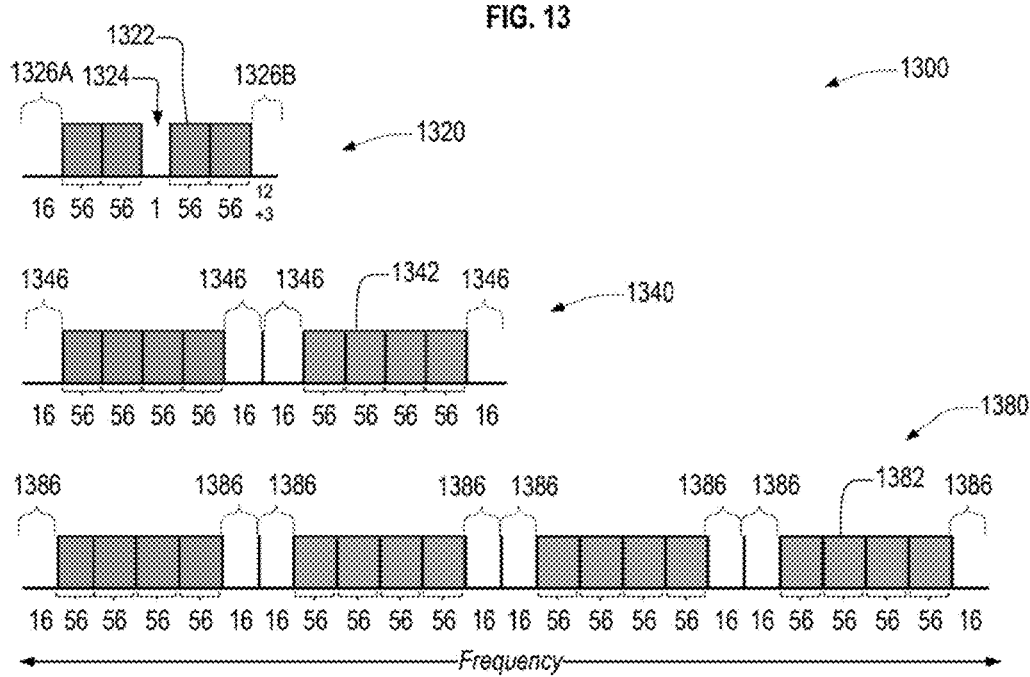

SUPPORT OF FREQUENCY DIVERSITY MODE FOR BLOCK CODE BASED TRANSMISSION IN OFDMA

CROSS-REFERENCE TO RELATED APPLICATION

This application is a continuation of U.S. patent application Ser. No. 15/047,488, filed on Feb. 18, 2016, now U.S. Pat. No. 9,860,099, to issue on Jan. 2, 2018, which claims priority to and the benefit of U.S. Provisional Application No. 62/117,901, filed on Feb. 18, 2015, the entire contents of which are incorporated herein by reference.

BACKGROUND

The technology described herein relates generally to wireless networking. More particularly, the technology relates generally to utilization of subcarriers in Orthogonal Frequency Division Multiplexing (OFDM) frames in a Wireless Local Area Network (WLAN).

A WLAN is being standardized by the IEEE (Institute of Electrical and Electronics Engineers) Part 11 under the name of "Wireless LAN Medium Access Control (MAC) and Physical Layer (PHY) Specifications." A series of standards have been adopted as the WLAN evolved, including IEEE Std 802.11™-2012 (March 2012) (hereinafter, IEEE 802.11). The IEEE Std 802.11™-2012 was subsequently amended by IEEE Std 802.11ae™-2012, IEEE Std 802.11aa™-2012, IEEE Std 802.11ad™-2012, and IEEE Std 802.11ac™-2013 (hereinafter, IEEE 802.11ac). These standards are each hereby incorporated by reference herein in their entirety.

The standards committee continues to work on new standards to improve upon the previously adopted standards. For example, the standards committee is currently working on IEEE 802.11ax that will define a high efficiency WLAN for enhancing the system throughput in high-density environments.

SUMMARY

Embodiments relate to transmitting and receiving frames using wireless devices, and in particular to transmitting and receiving Orthogonal Frequency Division Multiplexing (OFDM) frames.

In an embodiment of a method for transmitting a frame using a wireless device, the method comprises determining a channel bandwidth of the frame, determining a numerology of the frame according to the channel bandwidth, providing an indication according to the numerology in a field of the frame, and transmitting the frame using the numerology.

In an embodiment, the numerology determined is a first numerology when the channel bandwidth is equal to a pre-determined value.

In an embodiment, the pre-determined value is 20 MHz.

In an embodiment, the numerology determined is a first numerology when the channel bandwidth is equal to a pre-determined value and the frame is an Orthogonal Frequency Division Multiple Access (OFDMA) frame.

In an embodiment, the first numerology includes a numerology repeated across a plurality of subchannels of the frame, and each of the subchannels has a bandwidth equal to the predetermined value.

In an embodiment, the numerology determined is the first numerology when the channel bandwidth is equal to a pre-determined value, the frame is an Orthogonal Frequency Division Multiple Access (OFDMA) frame, and the frame is to be transmitted to a receiving device having an operational channel bandwidth less than the channel bandwidth of the frame.

In an embodiment, the indication according to the numerology includes an indication of a numerology scheme. The numerology scheme includes the numerology.

In an embodiment of a method for receiving a frame using a wireless device, the method comprising receiving a preamble of the frame, determining a numerology of the frame using the preamble, and receiving a remaining portion the frame using the numerology.

In an embodiment, the preamble includes an indication corresponding to a numerology or a numerology scheme.

In an embodiment, the method further comprises determining a channel bandwidth of the frame, and determining the numerology includes determining the numerology according to the channel bandwidth.

In an embodiment, the indication corresponds to a numerology scheme, the numerology scheme includes a plurality of numerologies, and determining the numerology includes selecting as the numerology a numerology corresponding to the channel bandwidth from among the plurality of numerologies.

In an embodiment of a method for transmitting a frame using a wireless device, the method comprises (a) determining, according to a value of a first constellation point of a spatial stream, a value of a first subcarrier of a first space-time stream corresponding to a transmission time slot, (b) determining, according to a value of a second constellation point of the spatial stream, a value of a second subcarrier of the first space-time stream corresponding to the transmission time slot, (c) determining, according to either a complex conjugate or a negative complex conjugate of the value of the second subcarrier of the first space-time stream corresponding to the transmission time slot, a value of a first subcarrier of a second space-time stream corresponding to the transmission time slot, and (d) determining, according to either a complex conjugate or a negative complex conjugate of the value of the first subcarrier of the first space-time stream corresponding to the transmission time slot, a value of a second subcarrier of the second space-time stream corresponding to the transmission time slot.

In an embodiment, (c) determining the value of the first subcarrier of the second space-time stream comprises determining the value of the first subcarrier of the second space-time stream according to the negative complex conjugate of the value of the second subcarrier of the first space-time stream, and (d) determining the value of the second subcarrier of the second space-time stream comprises determining the value of the second subcarrier of the second space-time stream according to the complex conjugate of the value of the second subcarrier of the first space-time stream.

In another embodiment, (c) determining the value of the first subcarrier of the second space-time stream comprises determining the value of the first subcarrier of the second space-time stream according to the complex conjugate of the value of the second subcarrier of the first space-time stream, and (d) determining the value of the second subcarrier of the second space-time stream comprises determining the value of the second subcarrier of the second space-time stream according to the negative complex conjugate of the value of the second subcarrier of the first space-time stream.

In an embodiment, the first subcarriers of the first and second space-time streams have nominal center frequencies equal to a first value, and the second subcarriers of the first and second space-time streams have nominal center frequencies equal to a second value.

In an embodiment, the first and second subcarriers of the first space-time stream are adjacent subcarriers, and the first and second subcarriers of the second space-time stream are adjacent subcarriers.

In an embodiment of a method for transmitting a frame using a wireless device, the method comprises (a) determining whether to transmit data using an orphan subcarrier pair, the orphan subcarrier pair including an orphan subcarrier of a first space-time stream and an orphan subcarrier of a second space-time stream, (b) transmitting a first constellation point of a spatial stream using the orphan subcarrier of the first space-time stream and a second constellation point of the spatial stream using the orphan subcarrier of the second space-time stream when a determination to use the orphan subcarrier pair to transmit data is made and a total number of constellation points corresponding to an Orthogonal Frequency Division Multiplexing (OFDM) symbol is an even number, and (c) transmitting a single constellation point of a spatial stream using the orphan subcarrier of the first space-time stream and the orphan subcarrier of the second space-time stream when the determination to use the orphan subcarrier pair to transmit data is made and the total number of constellation points corresponding to the OFDM symbol is an odd number.

In an embodiment the method further comprises using each of the orphan subcarrier of the first space-time stream and the orphan subcarrier of the second space-time stream as null carriers when a determination to not use the orphan subcarrier pair to transmit data is made.

BRIEF DESCRIPTION OF THE DRAWINGS

FIG. 3 illustrates components of a wireless device configured to transmit data according to an embodiment.

FIG. 4 illustrates Space-Time Block Encoding (STBC) according to an embodiment.

FIG. 5 illustrates Space-Frequency Block Encoding (SFBC) according to an embodiment.

FIG. 6 illustrates components of a wireless device configured to receive data according to an embodiment.

FIGS. 7A and 7B illustrates processes for performing SFBC encoding according to embodiments.

FIG. 8 illustrates an Orthogonal Frequency Division Multiple Access (OFDMA) frame according to an embodiment.

FIG. 9 illustrates an allocation of information to sub-bands of an OFDMA frame according to stations according to an embodiment.

FIG. 10 illustrates an OFDMA sub-band according to an embodiment.

FIGS. 12, 13, and 14 illustrate numerology schemes for frames according to embodiments.

DETAILED DESCRIPTION

Figure 1:
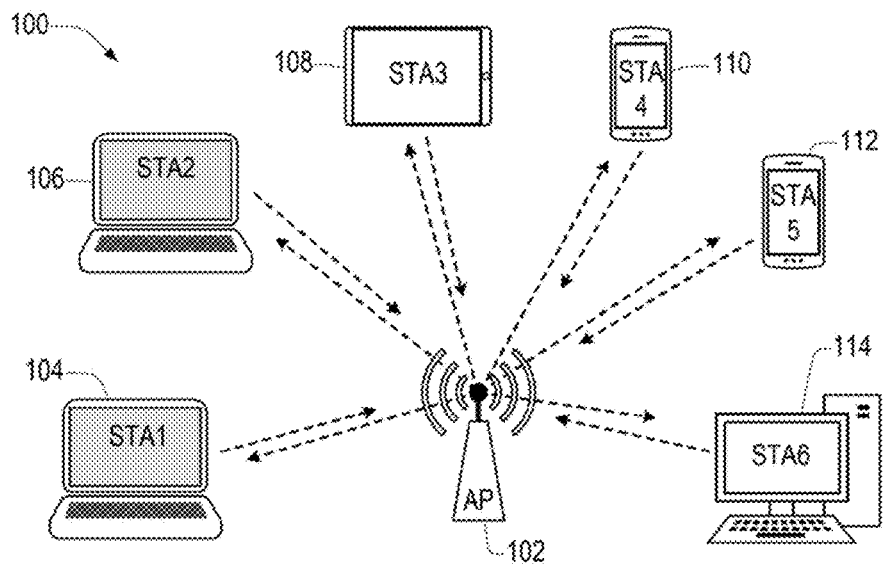
FIG. 1 illustrates a wireless network according to an embodiment.

The invention relates generally to wireless networking, e.g., the technology relating generally to utilization of subcarriers in Orthogonal Frequency Division Multiplexing (OFDM) frames in a Wireless Local Area Network (WLAN).

In the following detailed description, certain illustrative embodiments have been illustrated and described. As those skilled in the art would realize, the described embodiments may be modified in various different ways without departing from the spirit or scope of the present disclosure. Accordingly, the drawings and description are to be regarded as illustrative in nature and not restrictive. Like reference numerals designate like elements in the specification.

A transmitted signal of a WLAN may travel through an environment that produces scattering, reflection, refraction, and other types of distortion. The transmitted signal may also be distorted by interferences or thermal noise in the receiver. A variety of techniques may be employed in the WLAN to reduce the impact of signal distortions.

1. Space-Time Block Coding

IEEE 802.11ac incorporates Space Time Block Coding (STBC). STBC improve data transfer reliability in wireless systems by transmitting a data stream and variations of the data stream across a number of antennas. The environment of the WLAN distorts both the transmitted data stream and the transmitted variations of the data steam. Typically, the distortion of the transmitted data stream is different from the distortions of the transmitted variations of the data steam.

A receiver receives the distorted data stream and the distorted variations of the data stream. STBC combines the distorted data stream and the distorted variations of the data stream in order to extract as much information from each of them as possible.

In IEEE 802.11ac, STBC may be used to expand the spatial streams into twice as many space-time streams, that is, 1, 2, 3, and 4 spatial streams may be expanded into 2, 4, 6, and 8 space-time streams, respectively. Alamouti's scheme is used, and provides full transmit diversity gain with low complexity for a system with two antennas. Each spatial stream is expanded separately using Alamouti's code as follows: for first and second symbols $x_1$ and $x_2$ (in a time domain), a first spatial stream transmits the symbols $x_1$ and $x_2$ in their original order, and a second spatial stream transmits symbols $-x_2^*$ and $x_1^*$ having values corresponding to a negative complex conjugate of $x_2$ and a complex conjugate of $x_1$, respectively.

Thus, as shown in FIG. 4, discussed in more details below, the symbols $x_1$ and $x_2$ are transmitted using first and second transmitter outputs $y_1$ and $y_2$ at first and second times, respectively, as may be expressed by Equation 1:

$$y_1 = \begin{bmatrix} x_1 \\ -x_2^* \end{bmatrix}, y_2 = \begin{bmatrix} x_2 \\ x_1^* \end{bmatrix}. \quad \text{(Equation 1)}$$

wherein for each transmitter output at each time, a top element is a symbol transmitted using a first antenna, and a bottom element is a symbol transmitted using a second antenna. Notably, the first symbol $x_1$ is transmitted at a different time than the complex conjugate of the first symbol $x_1^*$, and the second symbol $x_2$ is transmitted at a different time than the negative complex conjugate of the second symbol $-x_2$.

First and second received symbols $r_1$ and $r_2$ at a IEEE 802.11ac compliant receiver having two antennas may be expressed by Equation 2:

$$r_1 = [h_{11} h_{12}] \begin{bmatrix} x_1 \\ -x_2^* \end{bmatrix} + n_1, \quad r_2 = [h_{21} h_{22}] \begin{bmatrix} x_2 \\ x_1^* \end{bmatrix} + n_2. \quad \text{(Equation 2)}$$

wherein $h_{ab}$ is a path gain for a path including an $a^{th}$ transmitting antenna and a $b^{th}$ receiving antenna, and $n_1$ and $n_2$ represent first and second additive white noise, respectively. The receiver can recover the transmitted symbols $x_1$ and $x_2$ using linear processing.

2. IEEE 802.11ax

WLAN devices are currently being deployed in diverse environments. These environments are characterized by the existence of many access points and non-AP stations in geographically limited areas. Increased interference from neighboring devices gives rise to performance degradation.

Furthermore, the WLAN devices are increasingly required to support a variety of applications such as video, cloud access, and cellular network offloading. In particular, video traffic is expected to be the dominant type of traffic in many high efficiency WLAN deployments. With the real-time requirements of some of these applications, WLAN users demand improved performance in delivering their applications, including improved power consumption for battery-operated devices.

Currently, an amendment to the IEEE Std 802.11™ (hereinafter, the IEEE 802.11ax amendment) is being developed by the IEEE 802.11ax task group. The amendment will define a high efficiency WLAN for enhancing the system throughput in high-density scenarios.

Unlike previous amendments that focused on improving aggregate throughput, the IEEE 802.11ax amendment is focused on improving metrics that reflect user experience, such as average per station throughput, the 5th percentile of per station throughput of a group of stations, and area throughput. Improvements will target environments such as wireless corporate offices, outdoor hotspots, dense residential apartments, and stadiums.

The focus of the IEEE 802.11ax amendment is on indoor and outdoor operation of the WLAN in the 2.4 GHz and the 5 GHz frequency bands. Additional bands between 1 GHz and 6 GHz may be added as they become available.

The target for increases in average throughput per station is in the range of 5-10 times, depending on a technology and a scenario of the WLAN. Outdoor operation is limited to stationary and pedestrian speeds.

Average throughput per station is directly proportional to both an aggregate basic service set (BSS) throughput and an area throughput. A 5th percentile measure of the per station throughput, that is, a measure of the throughput achieved by 95% of the stations, may be used to determine that a desired distribution of throughput among a number of stations in an area is satisfied. These metrics, along with satisfaction of packet delay and packet error ratio (PER) requirements of applications, will correspond to a user experience in identified scenarios.

Since the values of the metrics will depend on the scenario, the IEEE 802.11ax amendment will focus on a relative improvement of the metrics compared to previous IEEE 802.11 revisions (e.g., IEEE Std 802.11-2012 in a 2.4 GHz band and IEEE 802.11ac in a 5 GHz band). The WLAN according to the amendment may include a capability to handle multiple simultaneous communications in both spatial and frequency domains, in both uplink (UL) and downlink (DL) directions.

A WLAN according to the IEEE 802.11ax amendment, referred to as High Efficiency WLAN (HEW), is being designed to include robustness in outdoor channels, higher indoor efficiency, and Orthogonal Frequency Division Multiple Access (OFDMA), described below. One approach being discussed supports a longer Cyclic Prefix (CP) length in order to cover large channel delay spreads and a longer OFDM symbol duration based on a larger Fourier Transform (FT) size (e.g. a 256 sample FT size), relative to IEEE 802.11ac. However, the longer OFDM symbol duration may reduce the performance of Space-Time Block Coding (STBC).

One reason why a longer OFDM symbol duration may reduce the performance of STBC is that STBC relies on the properties of a channel remaining substantially unchanged (channel coherence) over time. For example, the channel being static during two successive time slots (a time slot being a time in which a symbol may be transmitted from an antenna on a subchannel) is required for STBC to work well.

An increase in the duration of a time slot, as envisioned for the HEW, increases the probability that the channel will not be static for two time slots. This may cause a symbol and a complex conjugate of the symbol transmitted at a different time than the symbol to experience different distortions from each other, which violates one of the underlying assumptions of STBC.

Secondly, a receiver only has a Short Inter-Frame Separation time (SIFS) after completing reception of a packet to finish decoding and determine a validity of a received frame. Within the SIFS, receiver must perform frequency offset compensation, Fourier transformation, equalization, de-interleaving, de-rate-matching, decoding, and frame checksum. IEEE 802.11ax currently envisions an SIFS of 10 microseconds (μs) for communications in a 2.4 GHz band and 16 μs for communications in a 5 GHz band.

Typically, the last (or last few) OFDM symbol(s) may be the most difficult to determine before the end of the SIFS. STBC is the worst case for this because a last two time slots of a transmission contain symbols in one time slot and respective complex conjugates of the symbols in the other time slot. The symbols and the respective complex conjugates of the symbols need to be processed together, which creates greater latency in the decoding chain.

Accordingly, an alternative to the use of STBC may be desirable.

3. Embodiments

FIG. 1 illustrates a wireless network according to an embodiment. The wireless network includes an infrastructure Basic Service Set (BSS) 100 of a Wireless Local Area Network (WLAN). In an 802.11 wireless LAN, the BSS provides the basic building-block and typically includes an access point (AP) and one or more associated stations (STAs). In FIG. 1, the BSS 100 includes an Access Point 102 wirelessly communicating with a plurality of wireless devices (or stations) 104 to 114 (also referred to as AP and STA1 to STA6). The WLAN device may include a medium access control layer (MAC) and a physical layer (PHY) according to an IEEE (Institute of Electrical and Electronics Engineers) standard 802.11.

The AP 102 is a station, that is, a STA, configured to control and coordinate functions of the BSS 100. The AP 102 may transmit information to a single station selected from the plurality of stations STA1 to STA6 in the BSS 100 using a single frame, or simultaneously transmit information to two or more (e.g., to all six) stations STA1 to STA6 in the BSS 100 using either a single Orthogonal Frequency Division Multiplexing (OFDM) broadcast frame, a single OFDM Multi-User Multi-Input-Multi-Output (MU-MIMO) transmission, or a single Orthogonal Frequency Division Multiple Access (OFDMA) frame.

The stations STA1 to STA6 may transmit data to the Access Point using a single frame, or transmit information to and receive information from another one of the stations STA1 to STA6 using a single frame.

Each of the stations STA1 to STA6 and the Access Point AP includes a processor and a transceiver, and may further include a user interface and a display device. The processor is configured to generate a frame to be transmitted through a wireless network, to process a frame received through the wireless network, and to execute protocols of the WLAN. The processor may perform some or all of its functions by executing computer programming instructions stored on a non-transitory computer-readable medium. The transceiver represents a unit functionally connected to the processor, and designed to transmit and receive a frame through the wireless network. The transceiver may be defined using a single component that performs the functions of transmitting and receiving, or two separate components each performing one of such functions.

An access point may include a WLAN router, a stand-alone Access Point, a WLAN bridge, a Light-Weight Access Point (LWAP) managed by a WLAN controller, and the like. In addition, a station such as a personal computer or cellular phone may be able to operate as an access point, such as when a cellular phone is configured to operate as a wireless "hot spot."

A station may include a desktop computer, a laptop computer, a tablet PC, a wireless phone, a mobile phone, a smart phone, an e-book reader, a Portable Multimedia Player (PMP), a portable game console, a navigation system, a digital camera, a Digital Multimedia Broadcasting (DMB) player, a digital audio recorder, a digital audio player, a digital picture recorder, a digital picture player, a digital video recorder, a digital video player, and the like.

The present disclosure may be applied to WLAN systems according to IEEE 802.11 standards but is not limited thereto.

In IEEE 802.11 standards, frames exchanged between stations (including access points) are classified into management frames, control frames, and data frames. The management frame may be a frame used for exchanging management information that are not forwarded to higher layer of a communication protocol stack. The control frame may be a frame used for controlling access to a medium. The data frame may be a frame used for transmitting data to be forwarded to higher layer of the communication protocol stack.

Each frame's type and subtype may be identified using a type field and a subtype field included in a control field of the frame, as prescribed in the applicable standard.

Figure 2:
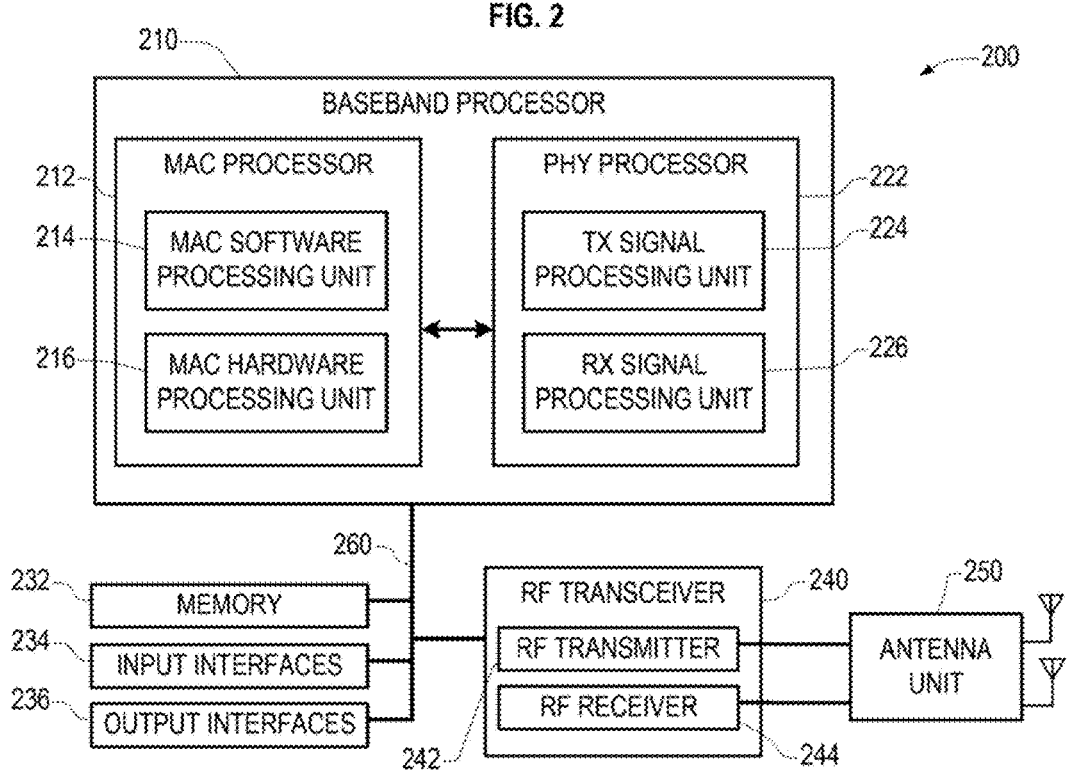
FIG. 2 illustrates a design of a wireless device according to an embodiment.

FIG. 2 illustrates a schematic block diagram of a wireless device 200 according to an embodiment. The wireless device 200 may be included in embodiments of one or more of the AP 102 and the stations 104 to 114 of the BSS 100 of FIG. 1.

The wireless or WLAN device 200 includes a baseband processor 210, a radio frequency (RF) transceiver 240, an antenna unit 250, a storage device (e.g., memory) 232, an input interface unit 234, and an output interface unit 236. The baseband processor 210, the memory 232, the input interface unit 234, the output interface unit 236, and the RF transceiver 240 may communicate with each other via a bus 260.

The baseband processor 210 performs baseband signal processing, and includes a MAC processor 212 and a PHY processor 222.

In an embodiment, the MAC processor 212 includes a MAC software processing unit 214 and a MAC hardware processing unit 216. The storage device (or memory) 232 may be a non-transitory computer readable media that stores software (i.e., computer programing instructions) hereinafter referred to as "MAC software". The MAC software processing unit 214 executes the MAC software to implement a first plurality of functions of the MAC layer. The MAC hardware processing unit 216 may implement a second plurality of functions of the MAC layer in special-purpose hardware, hereinafter referred to "MAC hardware." However, the MAC processor 212 is not limited thereto. For example, the MAC processor 212 may be configured to perform the first and second plurality of functions entirely in software or entirely in hardware according to implementation.

The PHY processor 222 includes a transmitting signal processing unit 224 and a receiving signal processing unit 226. The PHY processor 222 implement a plurality of functions of the PHY layer. These functions may be performed in software, hardware, or a combination thereof according to implementation. In an embodiment, the PHY processor 222 may be configured to generate channel state information (CSI) according to information received from the RF transceiver 240.

The CSI may include one or more of a Received Signal Strength Indication (RSSI), a Signal to Interference and Noise Ratio (SINR), a Modulation and Coding Scheme (MCS), and a Number of Spatial Streams (NSS). CSI may be generated for one or more of a frequency block, a sub-band within the frequency block, a subcarrier within a frequency block, a receiving antenna, a transmitting antenna, and combinations of a plurality thereof.

The RF transceiver 240 includes an RF transmitter 242 and an RF receiver 244. The RF transceiver 240 is configured to transmit first information received from the baseband processor 210 to the WLAN, and provide second information received from the WLAN to the baseband processor 210.

The antenna unit 250 includes one or more antennas. When Multiple-Input Multiple-Output (MIMO) or Multi-User MIMO (MU-MIMO) is used, the antenna unit 250 may include a plurality of antennas.

The input interface unit 234 receives information from a user, and the output interface unit 236 outputs information to the user. The input interface unit 234 may include one or more of a keyboard, keypad, mouse, touchscreen, touch screen, microphone, and the like. The output interface unit 236 may include one or more of a display device, touch screen, speaker, and the like.

A person of ordinary skill in the art in light of the teachings and disclosure herein would understand that many functions of the WLAN device 200 may be implemented in either hardware or software, and that which functions are implemented in software and which functions are implemented in hardware will vary according to constraints imposed on a design, which constraints may include one or more of design cost, manufacturing cost, time to market, power consumption, available semiconductor technology, and so on.

A person of ordinary skill in the art in light of the teachings and disclosure herein would understand that a wide variety of electronic devices, circuits, firmware, software, and combinations thereof known in the art may be used to implement the functions of the components of the WLAN device 200, and that the WLAN device 200 may include other widely-known components such as application processors, storage interfaces, clock generator circuits, power supply circuits, and the like, which have been omitted in the interest of brevity.

FIG. 3 illustrates components of a wireless device 300 configured to transmit data according to an embodiment, including a Transmission (Tx) Signal Processing Unit (TxSP) 310, and RF transmitter 360, an antenna unit 370, and first through fourth antennas 372, 374, 376, and 378. The TxSP 310, RF transmitter 360, and antenna unit 370 may be components of the transmitting signal processing unit 224, RF transmitter 242, and antenna unit 250 of the WLAN device 200 of FIG. 2 according to an embodiment.

The TxSP 310 includes a stream encoder 312, a stream parser 314, first and second interleavers 322 and 324, first and second mappers 326 and 328, a diversity encoder 330, a spatial mapper 334, first to fourth inverse Fourier Transformers (iFTs) 342, 344, 346, and 348, and first to fourth Guard Interval (GI) inserters 352, 354, 356, and 358.

The stream encoder 312 receives and encodes data. In an embodiment, the stream encoder 312 may include a Forward Error Correction (FEC) encoder. The FEC encoder may include a Binary Convolutional Code (BCC) encoder followed by a puncturing device, a Low-Density Parity-Check (LDPC) encoder, or one or more combinations thereof. A person of ordinary skill in the art in light of the teachings and disclosures herein would know of a variety of circuits, software, algorithms, and combinations thereof that are suitable for embodying the stream encoder 312.

In an embodiment, the TxSP 310 may further include a scrambler (not shown) for scrambling the input data before the encoding to reduce the probability of long sequences of 0s or 1s within the data. The TxSP 310 may further include an encoder parser (not shown) for demultiplexing the scrambled bits from the scrambler among a plurality of BCC encoders included in the FEC encoder when BCC encoding is used. The TxSP 310 may not use the encoder parser when LDPC encoding is used.

The stream parser 314 is configured to divide outputs of the encoder into one or more spatial streams. The stream parser 314 is shown dividing the outputs of the encoder into first and second spatial streams, that is, the Number of Spatial Streams ($N_{SS}$) is 2, but embodiments are not limited thereto, and in embodiments the $N_{SS}$ may be 1, 3, 4, or more.

In an embodiment, the stream parser 314 may allocate consecutive blocks of bits to the one or more spatial streams in a round robin fashion. The blocks of bits may have a length according to number of bits on an axis of a constellation point of a modulation and coding scheme, such as the length being 2 bits for 16QAM, 3 bits for 64QAM, 4 bits for 256QAM, and the like.

The respective bits of the first and second spatial streams are interleaved by first and second interleavers 322 and 324 when BCC encoding is used. On the other hand, the first and second spatial streams may bypass the first and second interleavers 322 and 324, or may be passed through the first and second interleavers 322 and 324, respectively, when BCC encoding is not used.

The first and second mappers 326 and 328 map the sequence of bits of the first and second spatial stream to first and second sequences of constellation points, respectively. A constellation point may include a complex number representing an amplitude and a phase.

Within each of the first and second sequences of constellation points, the constellation points are divided into groups. Each group of constellation points corresponds to an OFDM symbol to be transmitted, and each constellation points in a group corresponds to a different subcarrier in the corresponding OFDM symbol.

The first and second mappers 326 and 328 may also perform LDPC tone mapping when LDPC encoding is used.

A person of ordinary skill in the art in light of the teachings and disclosure herein would understand that a wide variety of electronic devices, circuits, firmware, software, and combinations thereof known in the art may be used to implement the functions of the stream parser 314, the interleavers 322 and 324, and the mappers 326 and 328.

The diversity encoder 330 is configured to spread the constellation points from the spatial streams into a plurality of space-time streams in order to provide diversity gain. In FIG. 3, the diversity encoder 330 is shown mapping two spatial steams into four space-time streams, that is, the $N_{SS}$ is equal to 2 and a Number of Space-Time Streams ($N_{STS}$) is equal to 4, but embodiment are not limited thereto. Each space-time-stream corresponds to a different transmitting antenna or a different beam of a beamformed antenna array. In an embodiment, the $N_{STS}$ is twice the $N_{SS}$.

The diversity encoder 330 spreads each input constellation point output by the mappers 326 and 328 onto first and second output constellation points. The first output constellation points is included in a first space-time stream and the second output constellation point is included in a second space time stream different from the first space time stream.

In an embodiment, the first output constellation point has a value corresponding to a value of the input constellation point, and the second output constellation point has a value corresponding to a complex conjugate of the value of the input constellation point or to a negative of the complex conjugate (i.e., a negative complex conjugate).

The first output constellation point is at a different time slot (that is, in a different OFDM symbol period) than the second output constellation point when space-time block coding (STBC) is used, as shown in FIG. 4. The first output constellation point is at a different frequency (that is, transmitted using a different subcarrier) than the second output constellation point when space-frequency block coding (SFBC) is used, as shown in FIG. 5. FIGS. 4 and 5 are described below.

The spatial mapper 334 maps the space-time streams to one or more transmit chains. The spatial mapper maps the space-time stream to the transmit chains using a one-to-one correspondence when direct mapping is used. The spatial mapper maps each constellation point in each space-time stream to a plurality of transmit chains when spatial expansion or beamforming is used. Mapping the space-time streams to the transmit chains may include multiplying constellation points of the space time streams associated with an OFDM subcarrier by a spatial mapping matrix associated with the OFDM subcarrier.

The first to fourth iFTs 342 to 348 convert blocks of constellation points output by the spatial mapper 334 to a time domain block (i.e., a symbol) by applying an inverse discrete Fourier transform (iDFT) or an inverse fast Fourier transform (iFFT) to each block. A number of constellation points in each block corresponds to a number of subcarriers in each symbol. A temporal length of the symbol corresponds to an inverse of the subcarrier spacing.

When Multi-Input Multi-Output (MIMO) or Multi-User MIMO (MU-MIMO) transmission is used, the TxSP 310 may insert Cyclic Shift Diversities (CSDs) to prevent unintentional beamforming. The CSD may be specified per transmit chain or may be specified per space-time stream.

The CSD insertion may occur before or after the iFTs 342 to 348. In an embodiment, the CSD may be applied by the spatial mapper 334.

The first to fourth GI inserters 352 to 358 prepends a Guard Interval (GI) to the symbol. The TxSP 310 may optionally perform windowing to smooth edges of each symbol after inserting the GI A person of ordinary skill in the art in light of the teachings and disclosure herein would understand that a wide variety of electronic devices, circuits, firmware, software, and combinations thereof known in the art may be used to implement the functions of the spatial mapper 334, the iFTs 342 to 348, and the GI inserters 352 to 358.

The RF transmitter 360 includes first, second, third and fourth transmit chains 362, 364, 366, and 368. The transmit chains 362 to 368 convert the symbols output from the respective GI inserters 352 to 358 into respective first to fourth RF transmit signals.

The antenna unit 370 couples the first to fourth RF transmit signals output by the RF transmitter 360 to the first to fourth antennas 372 to 378. The antennas 372 to 378 transmit the first to fourth RF transmit signals, respectively.

FIG. 4 illustrates operations of the diversity encoder 330 when STBC is used according to an embodiment. FIG. 4 illustrates a spatial stream 400 (SS) and corresponding first and second space-time streams 420 and 440 (STS1 and STS2). Each space-time-stream corresponds to a different transmitting antenna or a different beam of a beamformed antenna array.

The spatial stream SS includes a first input constellation point 412 corresponding to a first time slot 406 of a first subcarrier 402 and a second input constellation point 414 corresponding to a second time slot 408 of the first subcarrier 402. X1 represents a value of the first input constellation point 412, and X2 represents a value of the second input constellation point 414.

The diversity encoder 330 generates the first space-time stream STS1 having first and second output constellation points 432 and 434 associated with a subcarrier 422 of first and second OFDM symbols 426 and 428, respectively. The first output constellation point 432 has a value corresponding to X1. The second output constellation point 434 has a value corresponding to X2.

The diversity encoder 330 generates the second space-time stream STS2 having third and fourth output constellation points 452 and 454 associated with a subcarrier 442 of third and fourth OFDM symbols 446 and 448, respectively. The third output constellation point 452 has a value corresponding to a negative of a complex conjugate of X2. The fourth output constellation point 454 has a value corresponding to a complex conjugate of X1.

FIG. 5 illustrates operations of the diversity encoder 330 of FIG. 3 when Space Frequency Block Coding (SFBC) is used according to an embodiment. FIG. 5 illustrates a spatial stream 500 (SS) and corresponding first and second space-time streams 520 and 540 (STS1 and STS2). Each space-time-stream corresponds to a different transmitting antenna or a different beam of a beamformed antenna array.

The spatial stream SS includes a first input constellation point 512 associated with a first subcarrier 502 of a time slot 506 and a second input constellation point 514 associated with a second subcarrier 504 of the time slot 506. X1 represents a value of the first input constellation point 512, and X2 represents a value of the second input constellation point 514.

The diversity encoder 330 generates the first space-time stream STS1 having first and second output constellation points 532 and 534 associated with first and second subcarriers 522 and 524, respectively, of a first OFDM symbol 526. The first output constellation point 532 has a value corresponding to X1. The second output constellation point 534 has a value corresponding to X2.

The diversity encoder 330 generates the second space-time stream STS2 having third and fourth output constellation points 552 and 554 associated with first and second subcarriers 542 and 544, respectively, of a second OFDM symbol 546. The third output constellation point 552 has a value corresponding to a negative of a complex conjugate of X2. The fourth output constellation point 554 has a value corresponding to a complex conjugate of X1. The second OFDM symbol 546 corresponds to a same transmission time slot as the first OFDM symbol 526.

FIG. 6 illustrates components of a wireless device 600 configured to receive data according to an embodiment, including a Receiver (Rx) Signal Processing Unit (RxSP) 610, an RF receiver 660, an antenna unit 670, and first and second antennas 672 and 674. The RxSP 610, RF receiver 660, and antenna unit 670 may be components of the receiving signal processing unit 226, RF receiver 245, and antenna unit 250 of the WLAN device 200 of FIG. 2 according to an embodiment. The antenna unit 670 and antennas 672 and 674 may also operate as the antenna unit 370 and antennas 372 and 374 of FIG. 3.

The antennas 672 and 674 receive first and second RF received signals, respectively. The antenna unit 670 couples the first and second RF received signals to the RF receiver 660.

The RF receiver 660 includes first and second receive chains 662 and 664. The receive chains 662 to 668 convert the first and second RF received signals into first and second received symbol streams, respectively.

Although FIG. 6 illustrates the wireless device 600 including two antennas 672 and 674 and two receive chains 662 and 664, embodiments are not limited thereto, and an embodiment may have one, three, four, or more receiving antennas and corresponding receive chains.

In an embodiment, the wireless device is a first wireless device receiving signals transmitted by a second wireless device, and a first number of antennas and receive chains used by the first wireless device to receive the signals is different from a second number of antennas and transmit chains used by the second wireless device to transmit the signals.

The Receiver (Rx) Signal Processing Unit (RxSP) 610 receives the first and second received symbol streams. The RxSP 610 includes first and second Guard Interval (GI) removers 652 and 654, first and second Fourier Transformers (FTs) 642 and 644, a spatial demapper 634, a diversity decoder 630, first and second demappers 626 and 628, first and second deinterleavers 622 and 624, a stream deparser 614, and a stream decoder 612.

In an embodiment, each of the illustrated components of the RxSP 610 performs a function corresponding to an inverse of a function performed by a corresponding illustrated component of the TxSP 310 of FIG. 3.

The Guard Interval (GI) removers 652 and 654 removes the GI from the symbol in the first and second received symbol streams, respectively.

The FTs 642 and 644 receive the first and second received symbol streams from the GI removers 652 and 654, respectively. The FTs 642 and 644 convert blocks of received symbols (that is, time domain blocks) in the first and second received symbol streams into blocks of the constellation points (that is, frequency domain blocks), respectively, by using a discrete Fourier transform (DFT) or a fast Fourier transform (FFT).

A number of constellation points in each frequency domain block corresponds to a number of subcarriers in each received symbol. A number of received symbols in each time domain blocks corresponds to the number of constellation points in each block.

The FTs 642 and 644 output the blocks of the constellation points as first and second constellation point streams, respectively.

The spatial demapper 634 reconstructs and outputs space-time streams when one or more of STBC, SFBC, MIMO, and MU-MIMO is used to transmit the received signals. The space-time streams are associated with transmissions from respective antennas or from respective beams of a beam-formed antenna array. Each space-time stream includes a plurality of constellation points.

The spatial demapper 634 may reconstruct first to fourth space-time streams using the first and second constellation point streams and a plurality of channel state information (CSI). The plurality of CSI may include CSI for each combination of a transmitting antenna used by the transmitting device to transmit a spatial stream as a plurality of space-time streams and the antennas used by a receiving device to receive the space-time streams.

For example, when a first spatial stream is transmitted by the device of FIG. 3 as first and second space-time streams using the transmitting device's first and second antennas 372 and 374 and the first and second space-time streams are received by the device of FIG. 6 using the receiving device's first and second receive antennas 672 and 674, a first plurality of CSI is used to reconstruct the first and second space-time streams. The first plurality of CSI includes CSI for a channel including the first antenna 372 and the first receive antenna 672, CSI for a channel including the first antenna 372 and the second receive antenna 674, CSI for a channel including the second antenna 374 and the first receive antenna 672, and CSI for a channel including the second antenna 374 and the second receive antenna 674.

Furthermore, when a second spatial stream is transmitted by the device of FIG. 3 as third and fourth space-time streams using the third and fourth antennas 376 and 378 and the third and fourth space-time streams are received by the device of FIG. 6 using the first and second receive antennas 672 and 674, a second plurality of CSI is used to reconstruct the third and fourth space-time streams. The second plurality of CSI includes CSI for a channel including the third antenna 376 and the first receive antenna 672, CSI for a channel including the third antenna 376 and the second receive antenna 674, CSI for a channel including the fourth antenna 378 and the first receive antenna 672, and CSI for a channel including the fourth antenna 378 and the second receive antenna 674.

The spatial demapper 634 outputs the first and second constellation point streams when none of STBC, SFBC, MIMO, and MU-MIMO are used to transmit the received signals.

A person of ordinary skill in the art in light of the teachings and disclosures herein would know of a variety of circuits, software, algorithms, and combinations thereof that are suitable for embodying the spatial demapper 634.

The diversity decoder 630 despreads the constellation points from the first to fourth space-time streams into first and second spatial streams.

The diversity decoder 630 may determine each output constellation point in the first and second spatial streams using a constellation point from each of two different space-time streams. For example, each constellation point in the first spatial stream may be determined using one constellation point from each of the first and second space-time streams. Each constellation point in the second spatial stream may be determined using one constellation point from each of the third and fourth space-time streams in the same manner as the constellation point in the first spatial stream are determined.

Each constellation point in the first spatial stream may be determined using a constellation point of the first space-time stream corresponding to a first time slot and a first subcarrier frequency and a constellation point of the second space-time stream corresponding to a second time slot and the first subcarrier frequency when STBC is used. For example, considering FIG. 4, a first constellation point of the first spatial stream may be determined using the first output constellation point 432 of the first space-time stream STS1 and the fourth output constellation point 454 of the second space-time stream STS2 when STBC is used.

Each constellation point in the first spatial stream may be determined using a constellation point of the first space-time stream corresponding to a first time slot and a first subcarrier frequency and a constellation point of the second space-time stream corresponding to the first time slot and a second subcarrier frequency when SFBC is used. For example, considering FIG. 5, a first constellation point of the first spatial stream may be determined using the first output constellation point 532 of the first space-time stream STS1 and the fourth output constellation point 554 of the second space-time stream STS2 when SFBC is used.

A constellation point in a final time slot of the first spatial stream may be determined using an output constellation point in the last time slot of the first space-time stream STS1 and an output constellation point in the second to the last time slot of the second space-time stream STS2 when STBC is used. In contrast, a constellation point in a final time slot of the first spatial stream may be determined using an output constellation points in the respective last time slots of the first and second space-time streams STS1 and STS2 when SFBC is used. As a result, a minimum latency for decoding a constellation point corresponds to twice a duration of a time slot when STBC is used and corresponds to the duration of the time slot when SFBC is used.

A person of ordinary skill in the art in light of the teachings and disclosures herein would know of a variety of circuits, software, algorithms, and combinations thereof that are suitable for determining the constellation points of the spatial streams produced by diversity decoder 630.

The demappers 626 and 628 demap the constellation points of the first and second spatial streams into bit streams, respectively. The demappers 626 and 628 may further perform LDPC tone demapping before the constellation demapping when LDPC is used.

The deinterleavers 622 and 624 deinterleave the bits of the first and second spatial streams received from the demappers 626 and 628, respectively, when BCC encoding is used.

The stream deparser 614 combines the spatial streams output from the deinterleavers 622 and 624.

The stream decoder 612 decodes the combined spatial streams output from the stream deparser 614. For example, the stream decoder 612 may be an FEC decoder. The FEC decoder may include a BCC decoder, an LDPC decoder, or both.

The RxSP 610 may further include a descrambler for descrambling the decoded data. The RxSP 610 may further include an encoder deparser for multiplexing the data decoded by a plurality of BCC decoders when BCC is used. The RxSP 610 may not use the encoder deparser when LDPC is used.

FIG. 7A illustrates a process 700A for performing SFBC according to an embodiment. The process 700A may be performed by, for example, the diversity encoder 330 of the TxSP 310 of FIG. 3.

The process 700A processes a number of constellation points $N_{CP}$ for each of a number of spatial streams $N_{SS}$. Values of constellation points for subcarrier pairs for each of two space-time streams are determined during each iteration of the inner loop. Each space-time stream corresponds to transmissions from a respective antenna or a respective beam of a beamformed antenna array. The number of subcarrier pairs in each space-time stream is equal to half the number of constellation points $N_{CP}$ in each spatial stream.

At S702, a subcarrier pair index m is set to an initial value of zero. At S704, a spatial stream index i is set to an initial value of 1.

At S706A, values are computed for constellation points of subcarrier pairs of space time streams according to the illustrated equations. In the equations, STS[x] indicates an $x^{th}$ space-time stream (STS), STS[x].pair[y] indicates a $y^{th}$ subchannel pair of the $x^{th}$ STS, and STS[x].pair[y].subc[z] indicates a value of a constellation points of a $z^{th}$ subcarrier of the $y^{th}$ subchannel pair of the $x^{th}$ STS. CP[a,b] indicates a value of an $a^{th}$ constellation point of a $b^{th}$ spatial stream. CP[a,b]* indicates the complex conjugate of the value CP[a,b].

For example, in the first iteration of S706A, wherein the spatial stream index i is 1 and the subcarrier pair index m is 0:

a first subcarrier of a $0^{th}$ (first) subcarrier pair of a first space-time stream (STS[1].pair[0].subc[1]) is set to a value corresponding to a value of a constellation point 0 (that is, a first constellation point) of a first spatial stream (CP[0,1]), a second subcarrier of the first subcarrier pair of the first space-time stream (STS[1].pair[0].subc[2]) is set to a value corresponding to the value of a constellation point 1 (that is, a second constellation point) of the first spatial stream (CP[1,1]), a first subcarrier of a first subcarrier pair of a second space-time stream (STS[2].pair[0].subc[1]) is set to a value corresponding to a negative of a complex conjugate of the value of the second constellation point of the first spatial stream (−CP[1,1]*), and a second subcarrier of the first subcarrier pair of the second space-time stream (STS[2].pair[0].subc[2]) is set to a value corresponding to a complex conjugate of the value of the first constellation point of the first spatial stream (CP[0,1]*).

At S708, the spatial stream index $i_{STS}$ is incremented by 1. At S710, if the spatial stream index i is less than or equal to the number of spatial streams, the process 700 proceeds to S706A.

At S708, the subcarrier pair index m is incremented by 1. At S710, if twice the subcarrier pair index m is less than the number of constellation points $N_{CP}$, the process 700 proceeds to S706A.

TABLE 1

| No. of Space-Time Steams $N_{STS}$ | No. of Spatial Streams $N_{SS}$ | Space-Time Stream Index $i_{STS}$ | Value for subcarrier 1 of subcarrier pair m | Value for subcarrier 2 of subcarrier pair m |
|---|---|---|---|---|
| 2 | 1 | 1 | $d_{2m}$, 1 | $d_{2m+1}$, 1 |
|   |   | 2 | $-d^*_{2m+1}$, 1 | $d^*_{2m}$, 1 |
| 4 | 2 | 1 | $d_{2m}$, 1 | $d_{2m+1}$, 1 |
|   |   | 2 | $-d^*_{2m+1}$, 1 | $d^*_{2m}$, 1 |
|   |   | 3 | $d_{2m}$, 2 | $d_{2m+1}$, 2 |
|   |   | 4 | $-d^*_{2m+1}$, 2 | $d^*_{2m}$, 2 |
| 6 | 3 | 1 | $d_{2m}$, 1 | $d_{2m+1}$, 1 |
|   |   | 2 | $-d^*_{2m+1}$, 1 | $d^*_{2m}$, 1 |
|   |   | 3 | $d_{2m}$, 2 | $d_{2m+1}$, 2 |
|   |   | 4 | $-d^*_{2m+1}$, 2 | $d^*_{2m}$, 2 |
|   |   | 5 | $d_{2m}$, 3 | $d_{2m+1}$, 3 |
|   |   | 6 | $-d^*_{2m+1}$, 3 | $d^*_{2m}$, 3 |
| 8 | 4 | 1 | $d_{2m}$, 1 | $d_{2m+1}$, 1 |
|   |   | 2 | $-d^*_{2m+1}$, 1 | $d^*_{2m}$, 1 |
|   |   | 3 | $d_{2m}$, 2 | $d_{2m+1}$, 2 |
|   |   | 4 | $-d^*_{2m+1}$, 2 | $d^*_{2m}$, 2 |
|   |   | 5 | $d_{2m}$, 3 | $d_{2m+1}$, 3 |
|   |   | 6 | $-d^*_{2m+1}$, 3 | $d^*_{2m}$, 3 |
|   |   | 7 | $d_{2m}$, 4 | $d_{2m+1}$, 4 |
|   |   | 8 | $-d^*_{2m+1}$, 4 | $d^*_{2m}$, 4 |

Table 1, above, illustrates outputs of the process 700A for each subcarrier pair index m according to a number of spatial streams $N_{SS}$ and a corresponding number of space-time streams $N_{STS}$. In Table 1, "$d_x$, y" indicates a value of an $x^{th}$ constellation point of a $y^{th}$ spatial stream, "d*, y" indicates a value corresponding to a complex conjugate of the value $d_x$, y, and "$-d^*_x$, y" indicates a symbol corresponding to a negative of the complex conjugate of the value $d_x$, y. For example, when the number of space-time streams $N_{STS}$ is 4 and the number of spatial streams $N_{SS}$ is 2, Table 1 indicates that:

in the first space time stream (iSTS=1), a value of a first subcarrier of an $m^{th}$ subcarrier pair is set to a value of a $2*m^{th}$ constellation point of a first spatial stream and a value of a second subcarrier of the $m^{th}$ subcarrier pair is set to a value of a $2*m+1^{th}$ constellation point of the first spatial stream, and in the fourth space time stream (iSTS=4), a value of a first subcarrier of an $m^{th}$ subcarrier pair is set to a negative of a complex conjugate of a value of a $2*m^{th}$ constellation point of a second spatial stream and a value of a second subcarrier of the $m^{th}$ subcarrier pair is set to the value of the $2*m+1^{th}$ constellation point of the second spatial stream.

The process 700A performs complex conjugate operations on space-time streams having an even-numbered space-time stream index $i_{STS}$ ($i_{STS}$=2, 4, 6, and 8), and does not perform complex conjugate operations on space-time streams having a space-time stream index $i_{STS}$ ($i_{STS}$=1, 3, 5, and 7), as can be seen in Table 1. As a result, in an embodiment, one or more transmit chains, receiver chains, or both associated with one or more first space-time streams may not include a complex conjugate functionality, and one or more transmit chains, receiver chains, or both associated with one or more second space-time streams may include the complex conjugate functionality. For example, in an embodiment of the wireless device of FIG. 3, the transmit chains associated with the first and third space-time streams may not include the complex conjugate functionality, and the transmit chains associated with the second and fourth space-time streams may include the complex conjugate functionality.

A person of ordinary skill in the art in light of the teachings and disclosures herein would understand how to implement, without undue experimentation, a decoding process for decoding transmissions that were encoded using the process 700A of FIG. 7A. In the decoding process, a value of a 2 $m^{th}$ constellation point of a first spatial stream (corresponding to CP[2m,1]) may be recovered using a value of a first subcarrier of an $m^{th}$ subcarrier pair of a first space-time stream and a value of a second subcarrier of an $m^{th}$ subcarrier pair of a second space-time stream (corresponding to STS[2i−1].pair[m].subc[1] and STS[2i].pair[m].subc[2], respectively), and a value of a $2m+1^{th}$ constellation point of a first spatial stream (corresponding to CP[2m+1,1]) may be recovered using a value of a second subcarrier of the $m^{th}$ subcarrier pair of the first space-time stream and a value of a first subcarrier of the $m^{th}$ subcarrier pair of the second space-time stream (corresponding to STS[2i−1].pair[m].subc[2]) and STS[2i].pair[m].subc[1], respectively).

FIG. 7B illustrates another process 700B for performing SFBC according to an embodiment. The process 700B differs from the process 700A in that the operations of S706B differ from the operations of S706A. Specifically, which of the two complex conjugates is negated differs between S700A and S700B.

For example, in the first iteration of S706B, wherein the spatial stream index i is 1 and the constellation point index m is 0:
- a first subcarrier of a $0^{th}$ (first) subcarrier pair of a first space-time stream (STS[1].pair[0].subc[1]) is set to a value corresponding to a value of a constellation point 0 (that is, a first constellation point) of a first spatial stream (CP[0,1]),
- a second subcarrier of the first subcarrier pair of the first space-time stream (STS[1].pair[0].subc[2]) is set to a value corresponding to the value of a constellation point 1 (that is, a second constellation point) of the first spatial stream (CP[1,1]),
- a first subcarrier of a first subcarrier pair of a second space-time stream (STS[2].pair[0].subc[1]) is set to a value corresponding to a complex conjugate of the value of the second constellation point of the first spatial stream (−CP[1,1]*), and
- a second subcarrier of the first subcarrier pair of the second space-time stream (STS[2].pair[0].subc[2]) is set to a value corresponding to a negative of a complex conjugate of the value of the first constellation point of the first spatial stream (CP[0,1]*).

Table 2, below, illustrates outputs of the process 700B for each subcarrier pair index m in the same manner that Table 1, above, illustrates outputs of the process 700A.

In both process 700A and process 700B, a value of a first subcarrier of a second space-time stream corresponding to a transmission time slot is determined using either a complex conjugate or a negative complex conjugate of a value of a second subcarrier of a first space-time stream corresponding to the transmission time slot, and a value of a second subcarrier of the second space-time stream corresponding to the transmission time slot is determined using either a complex conjugate or a negative complex conjugate of a value of a first subcarrier of the first space-time stream corresponding to the transmission time slot.

In process 700A, the value of the first subcarrier of the second space-time stream is determined using the complex conjugate of the value of the second subcarrier of the first space-time stream, and the value of the second subcarrier of the second space-time stream is determined using the negative complex conjugate of the value of the first subcarrier of the first space-time stream.

In process 700B, the value of the first subcarrier of the second space-time stream is determined using the negative complex conjugate of the value of the second subcarrier of the first space-time stream, and the value of the second subcarrier of the second space-time stream is determined using the complex conjugate of the value of the first subcarrier of the first space-time stream.

TABLE 2

| No. of Space-Time Steams $N_{STS}$ | No. of Spatial Streams $N_{SS}$ | Space-Time Stream Index $i_{STS}$ | OFDM Symbol for subcarrier 1 of subcarrier pair | OFDM Symbol for subcarrier 2 of subcarrier pair |
|---|---|---|---|---|
| 2 | 1 | 1 | $d_{2m}$, 1 | $d_{2m+1}$, 1 |
|   |   | 2 | $d^*_{2m+1}$, 1 | $-d^*_{2m}$, 1 |
| 4 | 2 | 1 | $d_{2m}$, 1 | $d_{2m+1}$, 1 |
|   |   | 2 | $d^*_{2m+1}$, 1 | $-d^*_{2m}$, 1 |
|   |   | 3 | $d_{2m}$, 2 | $d_{2m+1}$, 2 |
|   |   | 4 | $d^*_{2m+1}$, 2 | $-d^*_{2m}$, 2 |
| 6 | 3 | 1 | $d_{2m}$, 1 | $d_{2m+1}$, 1 |
|   |   | 2 | $d^*_{2m+1}$, 1 | $-d^*_{2m}$, 1 |
|   |   | 3 | $d_{2m}$, 2 | $d_{2m+1}$, 2 |
|   |   | 4 | $d^*_{2m+1}$, 2 | $-d^*_{2m}$, 2 |
|   |   | 5 | $d_{2m}$, 3 | $d_{2m+1}$, 3 |
|   |   | 6 | $d^*_{2m+1}$, 3 | $-d^*_{2m}$, 3 |
| 8 | 4 | 1 | $d_{2m}$, 1 | $d_{2m+1}$, 1 |
|   |   | 2 | $d^*_{2m+1}$, 1 | $-d^*_{2m}$, 1 |
|   |   | 3 | $d_{2m}$, 2 | $d_{2m+1}$, 2 |
|   |   | 4 | $d^*_{2m+1}$, 2 | $-d^*_{2m}$, 2 |
|   |   | 5 | $d_{2m}$, 3 | $d_{2m+1}$, 3 |
|   |   | 6 | $d^*_{2m+1}$, 3 | $-d^*_{2m}$, 3 |
|   |   | 7 | $d_{2m}$, 4 | $d_{2m+1}$, 4 |
|   |   | 8 | $d^*_{2m+1}$, 4 | $-d^*_{2m}$, 4 |

A person of ordinary skill in the art in light of the teachings and disclosures herein would understand how to implement, without undue experimentation, a decoding process for decoding transmissions that were encoded using the process 700B of FIG. 7B. In the decoding process, a value of a 2 $m^{th}$ constellation point of a first spatial stream (corresponding to CP[2m,1]) may be recovered using a value of a first subcarrier of an $m^{th}$ subcarrier pair of a first space-time stream and a value of a second subcarrier of an $m^{th}$ subcarrier pair of a second space-time stream (corresponding to STS[2i−1].pair[m].subc[1] and STS[2i].pair[m].subc[2], respectively), and a value of a $2m+1^{th}$ constellation point of a first spatial stream (corresponding to CP[2m+1,1]) may be recovered using a value of a second subcarrier of the $m^{th}$ subcarrier pair of the first space-time stream and a value of a first subcarrier of the $m^{th}$ subcarrier pair of the second space-time stream (corresponding to STS[2i−1].pair[m].subc[2]) and STS[2i].pair[m].subc[1], respectively).

Like the process 700A of FIG. 7A, the process 700B performs complex conjugate operations on space-streams having an even-numbered space-time stream index $i_{STS}$ ($i_{STS}$=2, 4, 6, and 8), and does not perform complex conjugate operations on space-streams having an odd space-time stream index $i_{STS}$ ($i_{STS}$=1, 3, 5, and 7), as can be seen in Table 2.

Furthermore, in both the process 700A and the process 700B, the values sent using the first space-time stream (space-time stream index $i_{STS}$=1) when SFBC is used are the same as the values sent when neither SFBC nor STBC is used.

FIG. 8 illustrates an Orthogonal Frequency Division Multiple Access (OFDMA) frame 800 employed in an embodiment. Other frame formats may be employed in other embodiments. A channel bandwidth 806 of the frame 800 shown in FIG. 8 corresponds to 80 MHz, but embodiments are not limited thereto.

The frame 800 includes first and second 40 MHz bandwidths 804A and 804B. The first 40 MHz bandwidth 804A includes first and second 20 MHz bandwidths 802A and 802B. The second 40 MHz bandwidth 804B includes third and fourth 20 MHz bandwidths 802C and 802D.

The first to fourth 20 MHz bandwidths 802A through 802D includes first to fourth, fifth to eighth, ninth to twelfth, and thirteenth to sixteenth sub-bands 822 through 828, 842 through 848, 862 through 868, and 882 through 888, respectively. Although FIG. 7 shows each of the 20 MHz bandwidths 802A through 802D including four sub-bands, each sub-band spanning 5 MHz, embodiments are not limited thereto. In an embodiment, each of the 20 MHz bandwidths 802A through 802D includes nine sub-bands each spanning 2 MHz.

Each of the sub-bands 822 to 888 includes a plurality of subcarriers. In addition, each of the first to fourth 20 MHz bandwidths 802A through 802D may include a plurality of guard subcarriers other than the sub-carriers included in the sub-bands.

Embodiments of frame 800 may have a 160 MHz channel bandwidth comprised of two 80 MHz bandwidths, each configured as illustrated in FIG. 8. The two 80 MHz bandwidths may be adjacent or non-adjacent.

Another embodiment of frame 800 may have a 40 MHz channel bandwidth configured as illustrated for the 40 MHz bandwidth 804A illustrated in FIG. 8. Another embodiment of frame 800 may have a 20 MHz channel bandwidth configured as illustrated for the first 20 MHz bandwidth 802A illustrated in FIG. 8.

Each of the 20 MHz bandwidths 802A through 802D includes a legacy header 810 including a Legacy Short Training Field (L-STF), a Legacy Long Training Field (L-LTF), and a Legacy Signal Field (L-SIG). A person of ordinary skill in the art in light of the teachings and disclosures herein would be aware of the structure, contents and purposes of the L-STF, L-LTF, and L-SIG fields of the legacy header 810.

Each of the 20 MHz bandwidths 802A through 802D includes a High Efficiency Signal A (HE-SIGA) field 812 after the legacy header 810. The HE-SIGA field 812 may include information that may be interpreted by all High Efficiency WLAN (HEW) devices that receive the frame 800. The information in the HE-SIGA field 812 may be replicated across each of the 20 MHz bandwidths 802A through 802D when the frame 800 has a bandwidth of 40, 80, or 160 MHz.

Each of the sub-bands 822 to 888 includes a High Efficiency Signal B (HE-SIG B) field 814 and a data field 816. The HE-SIG B and data fields of each of the sub-bands 822 to 888 includes information and data, respectively, for delivery to the station to which the respective sub-band is allocated.

FIG. 9 illustrates an allocation of information to sub-bands of an OFDMA frame 800 according to stations according to an embodiment. A channel bandwidth 906 of the frame 900 shown in FIG. 9 corresponds to 80 MHz, but embodiments are not limited thereto.

The frame 900 includes first and second 40 MHz bandwidths 904A and 904B. The first 40 MHz bandwidth 904A includes first and second 20 MHz bandwidths 902A and 902B. The second 40 MHz bandwidth 904B includes third and fourth 20 MHz bandwidths 902C and 902D.

The first to fourth 20 MHz bandwidths 902A through 902D includes first to fourth, fifth to eighth, ninth to twelfth, and thirteenth to sixteenth sub-bands 922 through 928, 942 through 948, 962 through 968, and 982 through 988, respectively.

Each of the 20 MHz bandwidths 902A through 902D includes a Legacy header 910 including a Legacy Short Training Field (L-STF), a Legacy Long Training Field (L-LTF), and a Legacy Signal Field (L-SIG). Each of the 20 MHz bandwidths 902A through 902D also includes a High Efficiency Signal A (HE-SIGA) field 912 after the Legacy header 910. Each of the sub-bands 922 to 988 includes a High Efficiency Signal B (HE-SIG B) field 814 and a data field 816.

First and second sub-bands 922 and 924 of the first 20 MHz bandwidth 902A are allocated to a first station STA1 and include an HE-SIG B field 914 and a data field 916 for delivery to the first station STA1. First and second sub-bands 922 and 924 together correspond to a 10 MHz bandwidth.

Third and fourth sub-bands 926 and 928 of the first 20 MHz bandwidth 902A are allocated to a second station STA2 and include an HE-SIG B field 914 and a data field 916 for delivery to the second station STA2. Third and fourth sub-bands 926 and 928 together correspond to a 10 MHz bandwidth.

First sub-band 942 of the second 20 MHz bandwidth 902B is allocated to a third station STA3 and includes an HE-SIG B field 914 and data field 916 for delivery to the third station STA3. First sub-band 942 corresponds to a 5 MHz bandwidth.

Second, third, and fourth sub-bands 944, 946 and 948 of the second 20 MHz bandwidth 902B are allocated to a fourth station STA4 and include an HE-SIG B field 914 and a data field 916 for delivery to the fourth station STA4. Second, third and fourth sub-bands 944, 946 and 948 together correspond to a 15 MHz bandwidth. The 15 MHz bandwidth may include a 5 MHz bandwidth corresponding to second sub-band 944 and a 10 MHz bandwidth corresponding to third and fourth sub-bands 946 and 948.

First to fourth sub-bands 962 to 968 of the third 20 MHz bandwidth 902C are allocated to a fifth station STA5 and include an HE-SIG B field 914 and a data field 916 for delivery to the fifth station STA5. First to fourth sub-bands 982 to 988 of the fourth 20 MHz bandwidth 902D are allocated to a sixth station STA6 and include an HE-SIG B field 914 and a data field 916 for delivery to the sixth station STA6.

FIG. 10 illustrates SFBC subcarrier pairings among subcarriers in an OFDMA sub-band 1000 according to an embodiment. The OFDMA sub-band 1000 may be a sub-band of the OFDMA frame 800 of FIG. 8. The subcarriers of the sub-band 1000 include a DC subcarrier 1004 indicated by a dashed line, first to fourth pilot subcarriers 1010A to 1010D indicated by long arrows, and a plurality of data carriers 1020, indicated by short lines. First and second guard bands 1006A and 1006B delimit the sub-band 1000.

Although FIG. 10 illustrates the sub-band 1000 as having one DC subcarrier 1004, four pilot carriers 1010, and 48 data subcarriers 1020, embodiments are not limited thereto. Embodiments of the sub-band 1000 may have no or a plurality of DC subcarriers 1004, may have 1, 2, 3, or more than 4 pilot subcarriers 1010, and may have various numbers of data subcarriers 1020, such as, for example, 24, 52, 102, or 242 data subcarriers 1020.

In an embodiment, subcarriers paired together for SFBC in a first space-time stream used to transmit a spatial stream are also paired together for SFBC in a second space-time stream used to transmit the spatial stream. That is, nominal center frequencies of first and second subcarriers of a first SFBC subcarrier pairing of the first space-time stream will have first and second frequency values equal to nominal center frequencies of first and second subcarriers of a corresponding second SFBC subcarrier pairing of the first space-time stream, respectively, and the first and second SFBC subcarrier pairings are used together to transmit the spatial stream.

Accordingly, SFBC subcarrier pairings that are selected for the first space-time stream also are selected for the second space time stream. Furthermore, a subcarrier having a nominal center frequency value in the second space time stream is an orphan subcarrier, that is, is not paired to any other subcarrier, when a subcarrier having the same nominal center frequency value in the first space time stream is an orphan subcarrier.

A frequency interval may include an orphan data subcarrier when SFBC is employed and the frequency interval includes a total number of data subcarriers equal to an odd number. In an embodiment, one or more of a frequency interval between one of the guards 1006 and a nearest pilot subcarrier 1010, a frequency interval between two adjacent pilot subcarriers 1010, and a frequency interval between the DC subcarrier 1004 and a nearest pilot subcarrier 1010 may have a total number of data subcarriers equal to an odd number.

As used herein, a first subcarrier of a type is adjacent to a second subcarrier of the type when no other subcarrier of the type is between the first and second subcarrier. For example, a first pilot subcarrier is adjacent to a second pilot subcarrier when no other pilot subcarrier is between the first and second pilot subcarrier.

In an embodiment, the DC subcarrier 1004 may include a plurality of adjacent subcarriers. For example, the DC subcarrier 1004 may include three adjacent subcarriers or seven adjacent subcarriers.

In an embodiment, data subcarrier pairings for SFBC may include adjacent data subcarrier pairs, such as the fifth data subcarrier 1020E and the sixth data subcarrier 1020F. Because two adjacent data subcarriers have respective nominal center frequencies that are closer to each other than respective nominal center frequencies of two non-adjacent data subcarriers, channel characteristics for two adjacent data subcarriers will be typically have greater coherency than channel characteristics for two non-adjacent data subcarriers.

SFBC data subcarrier pairings in an OFDMA frame may include only data subcarriers allocated for communication to a same station. In an embodiment, SFBC data subcarrier pairings in an OFDMA frame may include only data subcarriers within a same OFDMA sub-band.

In an OFDM system, a majority of adjacent data subcarriers have respective nominal center frequencies that differ by a pre-determined first frequency difference. However, when two adjacent data subcarriers are separated by a pilot subcarrier or one or more DC subcarriers, the respective nominal center frequencies of the two adjacent data subcarriers will have a second frequency difference greater than the first frequency difference. As a result, a pairing of two adjacent data subcarriers separated by the pilot subcarrier or the one or more DC subcarriers may not be a selected pairing for SFBC because the coherency between the two adjacent data subcarriers will be reduced because the greater magnitude of the second frequency difference.

For example, first and second data subcarriers 1020A and 1020B may not be a desirable data subcarrier pairing for SFBC because of the presence of the pilot subcarrier 1010A between the first data subcarriers 1020A and the second data subcarriers 1020B. Third and fourth data subcarriers 1020C and 1020D may not be a desirable data subcarrier pairing for SFBC because of the presence of the DC subcarrier 1004 between the third data subcarriers 1020C and the fourth data subcarriers 1020D. The third and fourth data subcarriers 1020C and 1020D are even more undesirable for pairing when the DC subcarrier 1004 includes a plurality of subcarriers.

A sub-band may include subcarriers for which there is no desirable pairing for SFBC. In an embodiment, a subcarrier of a sub-band may not have a desirable pairing for SFBC because the sub-band has an odd number of data subcarriers, such as when a total number of data and pilot subcarriers in the sub-band is even and a total number of pilot carriers in the sub-band is odd, or when the total number of data and pilot subcarriers is odd and the total number of pilot carriers is even.

In an embodiment, a sub-band including one or more subcarriers for which there is no desirable pairing for SFBC is transmitted without using SFBC. An indication that SFBC has not been used in the sub-band may be included in a frame including the sub-band when the frame is transmitted. The indication may be, for example, a No-SFBC field of a HE-SIGB field of the sub-band having a pre-determined value.

In an embodiment, a subcarrier of a sub-band may not have a desirable pairing because the subcarrier and a nearest other subcarrier available for pairing (that is, not already paired) are separated by one or more pilot subcarriers, like the first data subcarriers 1020A and the second data subcarriers 1020B of FIG. 10, or by one or more DC subcarriers, like the third data subcarriers 1020C and the fourth data subcarriers 1020D of FIG. 10.

In an embodiment, a plurality of adjacent subcarriers between a DC subcarrier and a pilot subcarrier may include a data subcarrier that cannot be paired with another data subcarrier for SFBC when all of the adjacent subcarriers are data subcarriers, a count of the adjacent subcarriers has an odd value, SFBC pairing across the DC subcarrier is prohibited, and SFBC pairing across the pilot subcarrier is prohibited.

A process for determining subcarrier parings for SFBC may include pairing adjacent first and second data subcarrier when there is not a pre-determined type of subcarrier between the first and second data subcarrier. In an embodiment, the pre-determined type of subcarrier includes a DC subcarrier. In another embodiment, the pre-determined type of subcarrier includes the DC subcarrier and a pilot subcarrier.

A determination may be made of how to employ an unpaired subcarrier when a determination is made that an SFBC pairing is not available for the unpaired subcarrier.

Figure 11:
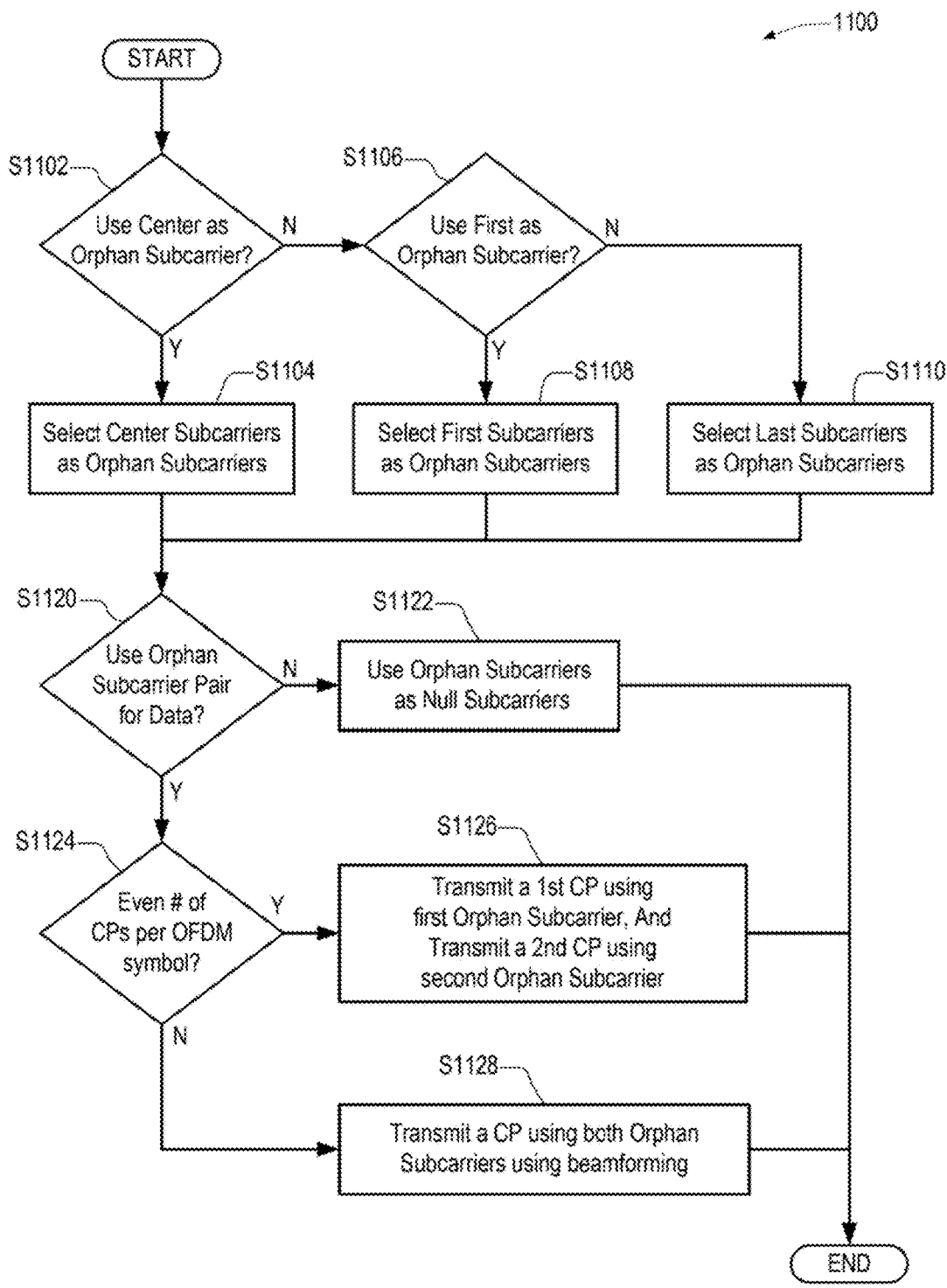
FIG. 11 illustrates a process of using a subcarrier not included in an SFBC subcarrier pairing according to an embodiment.

FIG. 11 illustrates a process 1100 of using subcarriers in a frame employing SFBC when there are orphan subcarriers of a frequency interval, according to an embodiment. The process 1100 determines the use of an orphan subcarrier pair, the orphan subcarrier pair including a first orphan subcarrier in a first space-time stream (STS) associated with a spatial stream and a second orphan subcarrier in a second STS associated with the spatial stream, wherein the first and second orphan subcarriers have a same nominal center frequency.

At S1102, a determination of whether to use center data subcarriers of the frequency interval as orphan subcarriers is made. The determination may be made according to a numerology associated with the frame.

At S1104, center data subcarriers of each of the first and second STS are selected as an orphan subcarrier pair when the determination to use center data subcarriers is made.

At S1106, a determination of whether to use first data subcarriers of the frequency interval as orphan subcarriers is made. A first data subcarrier may be a data subcarrier having a lowest nominal center frequency. The determination may be made according to the numerology associated with the frame.

At S1108, first data subcarriers of each of the first and second STS are selected as an orphan subcarrier pair when the determination to use the first data subcarriers is made.

At S1110, last data subcarriers of each of the first and second STS are selected as an orphan subcarrier pair when the determination to use neither the center nor first data subcarriers of the frequency interval is made. A last data subcarrier of the frequency interval may be a data subcarrier having a highest nominal center frequency.

At S1120, whether the orphan subcarriers will be used to transmit data is determined. The determination of whether to use the orphan subcarriers to transmit data may be made according to one or more of a BSS policy, a capability of a transmitting device, a capability of a receiving device, and the like.

At S1122, the orphan subcarriers are used as null subcarriers when the orphan subcarriers will not be used to transmit data. In another embodiment, the orphan subcarriers may be used as pilot carriers.

At S1124, it is determined whether a total number of constellation points of the spatial stream corresponding to an OFDM symbol is an even number.

At S1126, first and second constellation points may be transmitted using spatial modulation of the first and second orphan subcarrier, respectively, when the number of constellation points corresponding to the OFDM symbol is even. That is, the first constellation point is transmitted using the first orphan subcarrier in the first space-time stream, and the second constellation point is transmitted using the second orphan subcarrier in the second space-time stream.

At S1128, a single constellation point may be transmitted using spatial beamforming of the first and second orphan subcarrier when the number of constellation points corresponding to the OFDM symbol is odd. That is, the single constellation point is transmitted using both the first orphan subcarrier in the first space-time stream and the second orphan subcarrier in the second space-time stream.

Figure 14:
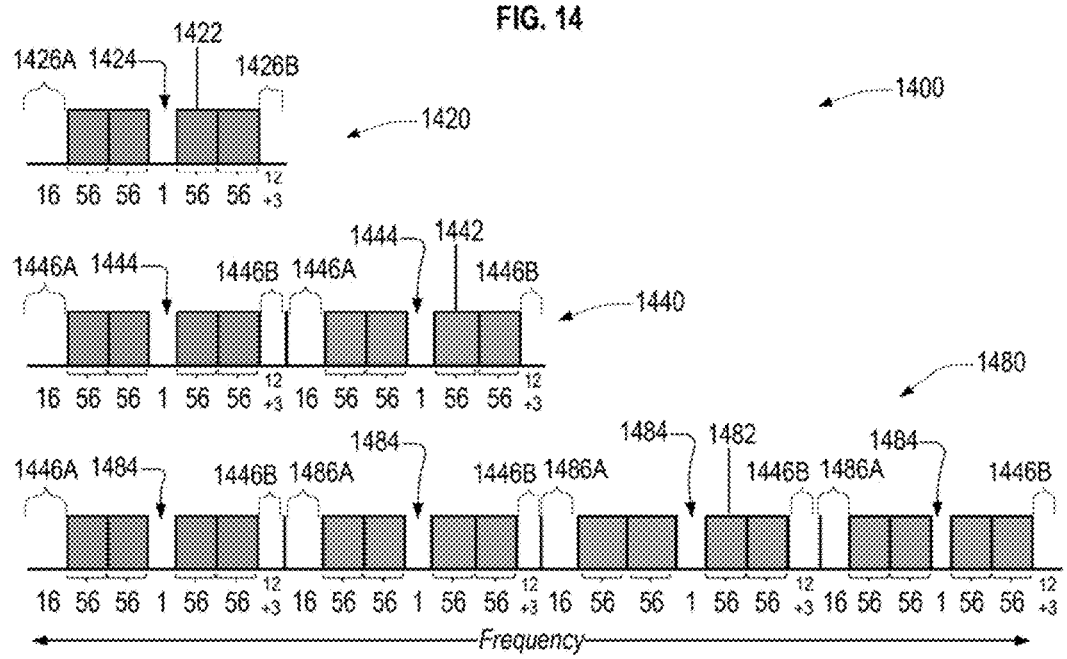

FIGS. 12-14 illustrate frequency numerology schemes (hereinafter, numerology schemes) of transmitted frames according to embodiments. Each numerology scheme includes a plurality of numerologies that map subcarrier frequencies to roles, such as guard, data, pilot, and DC, according to a channel bandwidth (CBW) of respective frames. Numbers below each element of the numerologies indicate the number of subcarriers includes in the element.

FIG. 12 illustrates a first numerology scheme 1200. The first numerology scheme 1200 includes a first 20 MHz numerology 1220 for frames having a 20 MHz CBW, a first 40 MHz numerology 1240 for frames having a 40 MHz CBW, and a first 80 MHz numerology 1280 for frames having an 80 MHz CBW. In an embodiment, a numerology for a frame having a 160 MHz CBW includes first and second first 80 MHz numerologies 1280 applied to first and second 80 MHz subchannels, respectively.

The first 20 MHz numerology 1220 includes four sub-bands 1222 (shaded blocks), left and right guard regions 1226A and 1226B, and a DC subcarrier 1224, each disposed as indicated in FIG. 12. The left guard region 1226A includes 16 subcarriers, each of the sub-bands 1222 includes 56 subcarriers (including data and pilot subcarriers), the DC subcarrier 1224 includes 1 subcarrier, and the right guard region 1226B includes 15 subcarriers. The first 20 MHz numerology 1220 includes a total of 256 subcarriers.

The first 40 MHz numerology 1240 includes eight sub-bands 1242 (shaded blocks), left and right guard regions 1246A and 1246B, and a DC subcarrier 1244, each disposed as indicated in FIG. 12. The left guard region 1246A includes 16 subcarriers, each of the sub-bands 1242 includes 60 subcarriers (including data and pilot subcarriers), the DC subcarrier 1244 includes 1 subcarrier, and the right guard region 1226B includes 15 subcarriers. The first 40 MHz numerology 1240 includes a total of 512 subcarriers.

The first 80 MHz numerology 1280 includes 16 sub-bands 1282 (shaded blocks), left and right guard regions 1286A and 1286B, and a DC subcarrier 1284, each disposed as indicated in FIG. 12. The left guard region 1286A includes 16 subcarriers, each of the sub-bands 1282 includes 62 subcarriers, the DC subcarrier 1284 includes 1 subcarrier, and the right guard region 1286B includes 15 subcarriers. The first 80 MHz numerology 1280 includes a total of 1024 subcarriers.

The first 20 MHz numerology 1220 includes a total of 224 data and pilot subcarriers in a 20 MHz CBW. The first 40 MHz numerology 1240 and the first 80 MHz numerology 1280 respectively include 240 and 248 data and pilot subcarriers in each 20 MHz of CBW. As a result, the first 40 MHz numerology 1240 and the first 80 MHz numerology 1280 permit more information to be transmitted within each 20 MHz of CBW.

FIG. 13 illustrates a second numerology scheme 1300. The second numerology scheme 1300 includes a second 20 MHz numerology 1320 for frames having a 20 MHz CBW, a second 40 MHz numerology 1340 for frames having a 40 MHz CBW, and a second 80 MHz numerology 1380 for frames having an 80 MHz CBW. In an embodiment, a numerology for a frame having a 160 MHz CBW includes first and second 80 MHz numerologies 1380 applied to first and second 80 MHz subchannels, respectively.

The second 20 MHz numerology 1320 includes four sub-bands 1322 (shaded blocks), left and right guard regions 1326A and 1326B, and a DC subcarrier 1324, each disposed as indicated in FIG. 13. The left guard region 1326A includes 16 subcarriers, each of the sub-bands 1322 includes 56 subcarriers (including data and pilot subcarriers), the DC subcarrier 1324 includes 1 subcarrier, and the right guard region 1326B includes 15 subcarriers. The second 20 MHz numerology 1320 includes a total of 256 subcarriers.

The second 40 MHz numerology 1340 includes eight sub-bands 1342 (shaded blocks) and four guard regions 1346, each disposed as indicated in FIG. 13. Each of the guard regions 1346 includes 16 subcarriers, and each of the sub-bands 1342 includes 56 subcarriers (including data and pilot subcarriers). The second 40 MHz numerology 1340 includes a total of 512 subcarriers.

The second 80 MHz numerology 1380 includes 16 sub-bands 1382 (shaded blocks) and eight guard regions 1386, each disposed as indicated in FIG. 13. Each of the guard regions 1386 includes 16 subcarriers and each of the sub-bands 1382 includes 56 subcarriers. The second 80 MHz numerology 1380 includes a total of 1024 subcarriers.

FIG. 14 illustrates a third numerology scheme 1400. The third numerology scheme 1300 includes a third 20 MHz numerology 1420 for frames having a 20 MHz CBW, a third 40 Mhz numerology 1440 for frames having a 40 MHz CBW, and a third 80 MHz numerology 1480 for frames having a 80 MHz CBW. In an embodiment, a numerology for a frame having a 160 MHz CBW includes first and second third 80 MHz numerologies 1380 applied to first and second 80 MHz subchannels, respectively.

The third 20 MHz numerology 1420 includes four sub-bands 1422 (shaded blocks), left and right guard regions 1426A and 1426B, and a DC subcarrier 1424, each disposed as indicated in FIG. 14. The left guard region 1426A includes 16 subcarriers, each of the sub-bands 1422 includes 56 subcarriers (including data and pilot subcarriers), the DC subcarrier 1424 includes 1 subcarrier, and the right guard region 1426B includes 15 subcarriers. The third 20 MHz numerology 1420 includes a total of 256 subcarriers.

The third 40 MHz numerology 1440 duplicates the third 20 MHz numerology 1420 across first and second adjacent 20 MHz subchannels. Accordingly, the third 40 MHz numerology 1440 includes eight sub-bands 1442 (shaded blocks), two each of left and right guard regions 1446A and 1446B, and two DC subcarriers 1444, each disposed as indicated in FIG. 14. The left guard regions 1446A includes 16 subcarriers, each of the sub-bands 1442 includes 56 subcarriers (including data and pilot subcarriers), the DC subcarriers 1444 includes 1 subcarrier, and the right guard regions 1446B includes 15 subcarriers. The third 20 MHz numerology 1440 includes a total of 512 subcarriers.

The third 80 MHz numerology 1480 duplicates the third 20 MHz numerology 1420 across first to fourth adjacent 20 MHz subchannels. Accordingly, the third 80 MHz numerology 1480 includes sixteen sub-bands 1482 (shaded blocks), four each of left and right guard regions 1486A and 1486B, and four DC subcarriers 1484, each disposed as indicated in FIG. 14. The left guard regions 1486A each include 16 subcarriers, each of the sub-bands 1482 includes 56 subcarriers (including data and pilot subcarriers), the DC subcarriers 1484 each include 1 subcarrier, and the right guard regions 1426B each include 15 subcarriers. The third 80 MHz numerology 1480 includes a total of 1024 subcarriers.

A receiving station configured to receive a frame configured according to a first numerology may not be able to properly receive a frame configured according to a second numerology when the first numerology has a different assignment of subcarriers to roles than the second numerology.

In a BSS without OFDMA capability, transmissions to a station are performed using a Channel BandWidth (CBW) supported by a receiving station for which the transmission is intended. However, in a BSS with OFDMA capability, a transmission to multiple stations may have a CBW greater than a CBW supported by one or more of the stations.

For example, an access point in an OFDMA-capable BSS may use an OFDMA frame having 80 MHz CBW to transmit information to a plurality of receiving stations, such as the OFDMA frame 900 shown in FIG. 9. When a receiving station only has an operational channel width of, for example, 20 MHz, information intended for the receiving station may be included in a 20 MHz subchannel of the 80 MHz CBW.

An embodiment of a receiving station having a 20 MHz operational channel bandwidth, that is, that is able to receive information in only one 20 MHz subchannel at any one time, may be configured to operate according to a single numerology. For example, a receiving station having a 20 MHz operational channel bandwidth may only be able to receive information transmitted according to the first 20 MHz numerology 1220 of FIG. 12.

An embodiment of a receiving station have an operational channel bandwidth greater than 20 MHz may be designed to operate according to a plurality of numerologies. For example, a receiving station having 80 MHz operational channel bandwidth may be configured to receive information transmitted according to any of the numerologies illustrated in FIGS. 12-14. A receiving station may determine a numerology to use for a frame according to a CBW indication included in the frame.

A transmitting station in an OFDMA-capable BSS, such as an access point, may be configured to dynamically determine a numerology of a transmitted frame according to characteristics of the transmitted frame and characteristics of the receiving stations for which the frame is intended.

For example, in an embodiment, the access point may be configured to transmit a frame using one of the numerologies of FIG. 12 when the frame is a non-OFDMA frame, to transmit the frame using one of the numerologies of FIG. 13 when the frame is an OFDMA frame and all of receiving stations of the frame have an operation channel bandwidth equal to or greater than the CBW of the frame, and to transmit the frame using one of the numerologies of FIG. 14 when the frame is an OFDMA frame and one or more of the receiving stations of the frame have an operation channel bandwidth less than the CBW of the frame.

Figure 15:
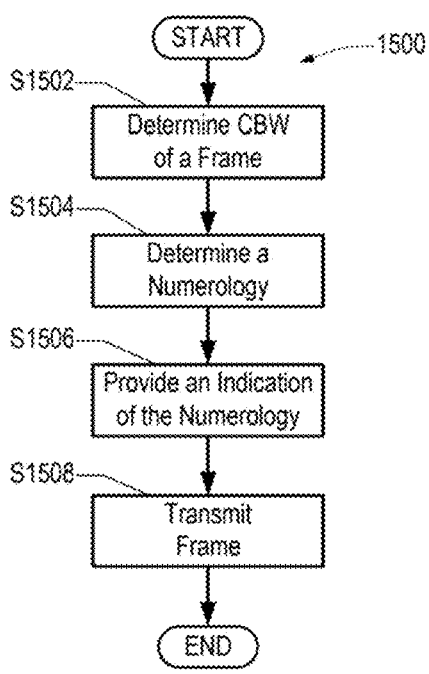
FIG. 15 illustrates a process for transmitting a frame using a dynamically determined numerology according to an embodiment.

FIG. 15 illustrates a process 1500 for transmitting a frame using a dynamically determined numerology according to an embodiment. The process 1500 may be carried out by an OFDMA-capable wireless device, such as the wireless device 200 of FIG. 2.

At S1502, a channel bandwidth (CBW) for transmitting a frame is determined. The CBW may be determined according to one or more of an amount of information in the frame, a cardinality of a plurality of receiving stations of the frame, capabilities of the receiving stations, and the like. In an embodiment the frame is an OFDMA frame.

At S1504, a numerology of the frame is determined. The numerology may be determined according to one or more of the allocation of subcarriers to the receiving stations, the capabilities of the receiving stations, a policy of the BSS, and the like.

At S1506, an indication of the numerology is provided. The indication may include bits in a field of a preamble of the frame, such as, for example, bits in an HE-SIGB field of the frame. The indication may indicate a numerology scheme including a plurality of numerologies according to respective CBWs.

At S1508, the frame is transmitted using the numerology and the CBW.

Figure 16:
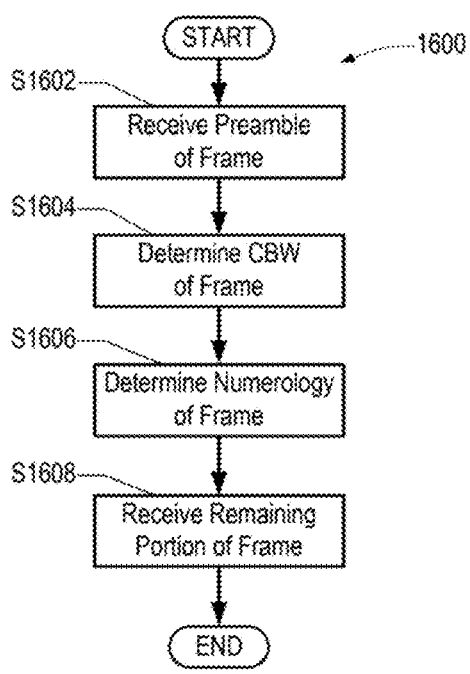
FIG. 16 illustrates a process for receiving a frame transmitted using a dynamically determined numerology according to an embodiment.

FIG. 16 illustrates a process 1600 for receiving a frame which was transmitted using a dynamically determined numerology according to an embodiment. For example, the process 1600 may be used to receive a frame transmitted using the process 1500 of FIG. 15. The process 1600 may be carried out by an OFDMA-capable wireless device, such as the wireless device 200 of FIG. 2.

At S1602, a preamble of the frame is received.

At S1604, a channel bandwidth (CBW) of the frame is determined. The CBW may be determined according to the preamble of the frame.

At S1606, a numerology of the frame is determined. The numerology of the frame may be determined according to a field of the preamble including an indication of the numerology.

In an embodiment, the numerology of the frame may be determined according to the CBW of the frame and a field of the preamble including an indication of a numerology scheme. For example, the numerology of the frame may be determined by selecting a numerology corresponding to the CBW from among a plurality of numerologies of the numerology scheme.

At S1608, a remaining portion of the frame, that is, a portion of the frame following the preamble, is received according to the CBW and the numerology.

Figure 17:
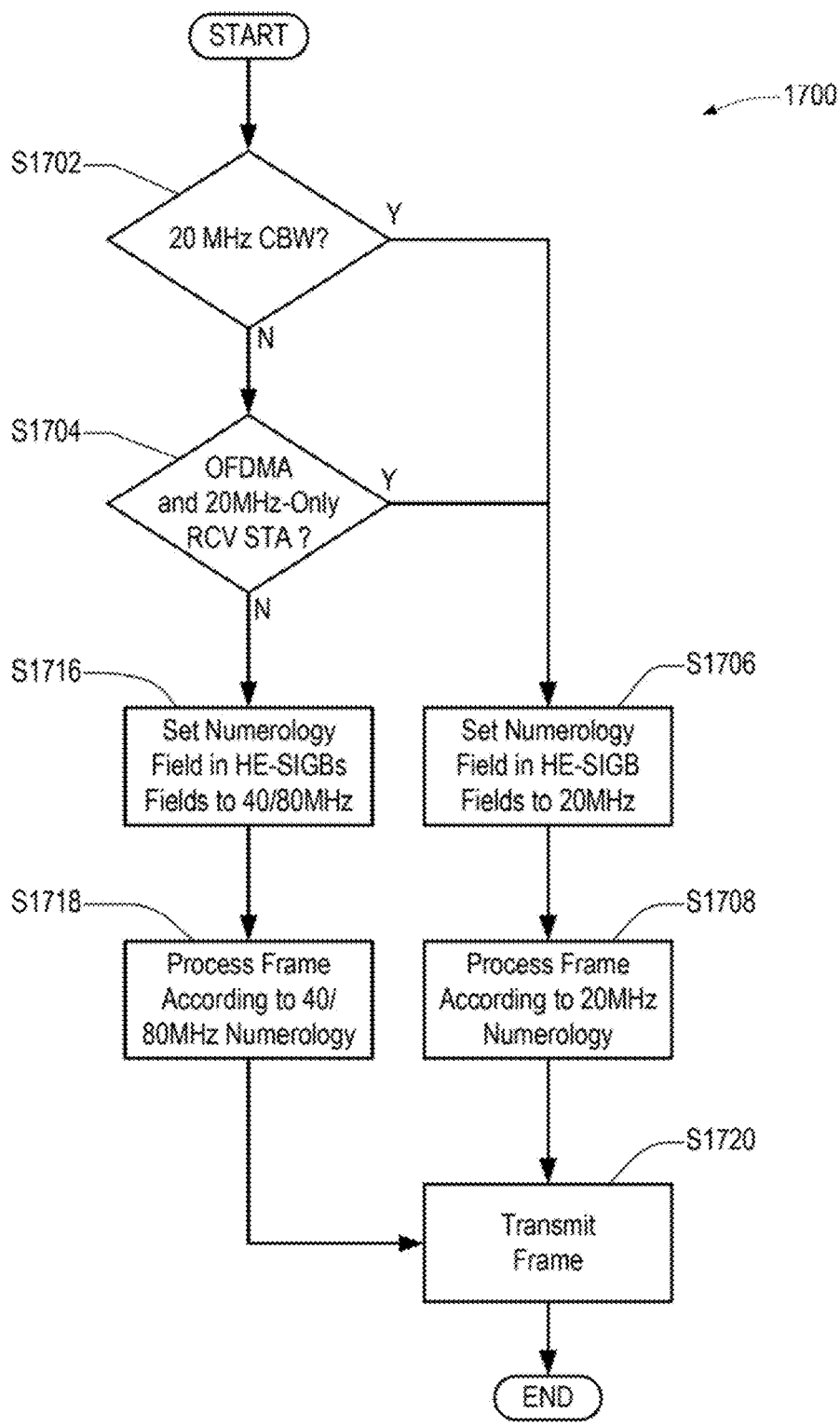
FIG. 17 illustrates a process for transmitting a frame using a dynamically determined numerology according to another embodiment.

FIG. 17 illustrates a process 1700 for transmitting a frame using a dynamically determined numerology according to another embodiment. The process 1700 may be carried out by an OFDMA-capable wireless device, such as the wireless device 200 of FIG. 2.

At S1702, whether the frame is to be transmitted using a 20 MHz CBW is determined. A person of ordinary skill in the art in light of the teachings and disclosure herein would understand how to determine the CBW to use to transmit the frame.

At S1704, whether the frame is an OFDMA frame and whether one or more of the receiving stations for which the frame includes information is only able to operate according to a 20 MHz numerology is determined. Determining whether the one or more of the receiving stations is only able to operate according to the 20 MHz numerology may use capability information previously received from the one or more of the receiving stations.

At S1706, one or more numerology fields in the frame are set to indicate a 20 MHz numerology when the frame is to be transmitted using a 20 MHZ CBW or when the frame is an OFDMA frame and the one or more of the of the receiving stations for which the frame includes information is only able to operate according to a 20 MHz numerology.

At S1708, the frame having the one or more numerology fields set to indicate the 20 MHz numerology is processed according to the 20 MHz numerology. The processing of the frame according to the 20 MHz numerology may include duplicating the 20 MHz numerology across each 20 MHz bandwidth of the frame when the CBW of the frame is greater than 20 MHz. The processing of the frame according to the 20 MHz numerology may include assigning constellation points to subcarriers according to the 20 MHz numerology using one or more mappers, such as the mappers 326 and 328 of FIG. 3, and on or more iFTs, such as the iFTs 342 to 348 of FIG. 3.

At S1716, one or more numerology fields in the frame are set to indicate a 40, 80, or 160 MHz numerology when the frame is to be transmitted using a 40, 80, or 160 MHZ CBW, respectively, and the frame is a non-OFDMA frame or the frame is an OFDMA frame and all of the receiving stations for which the frame includes information are able to operate using the 40, 80, or 160 MHz numerology.

In an embodiment, the one or more numerology fields are fields in a preamble of the frame. In an embodiment, the one or more numerology fields are fields in respective one or more HE-SIGB fields of respective OFDMA sub-bands of the frame, such as the HE-SIGB fields 814 of the frame 800 illustrated in FIG. 8. In another embodiment, the one or more numerology fields are fields in respective one or more HE-SIGA fields of 20 MHz subchannels of the frame, such as the HE-SIGA fields 812 of the frame 800 illustrated in FIG. 8.

In an embodiment, a numerology field indicates a numerology scheme, for example, one of the numerology schemes 1200-1400 of FIGS. 12-14, respectively. A numerology may be determined according to the numerology scheme indicated by the numerology field and an indication of the CBW of the frame. In an embodiment, the indication of the CBW of the frame may include one or more bits in an HE-SIGA field of the frame. In another embodiment, the indication of the CBW of the frame may include one or more bits in an HE-SIGB field of the frame.

In an embodiment wherein the frame includes a plurality of numerology fields, each numerology field indicates a same numerology of a plurality of numerologies when the numerology fields indicate a numerology, and each numerology field indicates a same numerology scheme of a plurality of numerology schemes when the numerology fields indicate a numerology scheme.

At S1718, the frame having the one or more numerology fields set to indicate the 40, 80, or 160 MHz numerology is processed according to the indicated numerology.

At S1720, the frame is transmitted.

The process 1700 has been described in the context of receiving devices having at least an operational channel bandwidth of 20 MHz and correspondingly a 20 MHz numerology corresponding to a bandwidth of 20 MHz, but embodiments are not limited thereto. For example, in a context wherein a receiving device may have a minimum operational channel bandwidth of 5 MHz, the process 1700 may duplicate a 5 MHz numerology having a 5 MHz bandwidth across the CBW of a transmitted OFDMA frame.

A person of ordinary skill in the art in light of the teachings and disclosure herein would understand how to implement, without undue experimentation, a process for receiving a frame transmitted using the process 1700 of FIG. 17, including determining a numerology according to a numerology field of the frame or according to one or more of the numerology field, an indication of a channel bandwidth of the frame, and a pre-determined one or more numerology schemes.

In above explanations and figures, illustrative embodiments were provided to allow a person of skill in the art to understand and implement embodiments of the disclosure. However, embodiments are not limited thereto, and are therefore not limited to the number of STAs, specific identifications, specific formats, specific number of STAs per identifications, or other specifics of the illustrative embodiments. Furthermore, while in the description and related figures the reference has made to one or more IEEE Std 802.11 standards, embodiments are not limited thereto, and a person of skill in the art in light of the teachings and disclosures herein would understand how the present disclosures apply to any wireless operation that operates in licensed or unlicensed bands.

While this invention has been described in connection with what is presently considered to be practical embodiments, embodiments are not limited to the disclosed embodiments, but, on the contrary, may include various modifications and equivalent arrangements included within the spirit and scope of the appended claims. Further, two or more embodiments may be combined.

What is claimed is:

1. A method for transmitting a frame using a wireless device, the method comprising:
   determining, by the wireless device, a channel bandwidth of the frame;
   determining, by the wireless device, a numerology of the frame according to the channel bandwidth, wherein determining the numerology includes selecting the numerology from among a first numerology and a second numerology;
   providing, by the wireless device, an indication according to the numerology in a field of the frame; and
   transmitting, by the wireless device, the frame using the numerology,
   wherein each of the first numerology and the second numerology corresponds to mappings of subcarrier frequencies to respective roles, including:
      at least one mapping of a first subcarrier frequency to a guard band role,
      at least one mapping of a second subcarrier frequency to a DC subcarrier role, and
      at least one mapping of a plurality of contiguous subcarrier frequencies to a subband role,
   wherein the first numerology is different from the second numerology, and
   wherein when the numerology is determined to be the second numerology:
      the channel bandwidth of the frame includes a first 20 MHz bandwidth and a second 20 MHz bandwidth,
      the mappings of subcarrier frequencies to respective roles in the first 20 MHz bandwidth by the second numerology does not correspond to the mappings of subcarrier frequencies to respective roles in the first numerology, and
      the mappings of subcarrier frequencies to respective roles in the second 20 MHz bandwidth by the second numerology does not correspond to the mappings of subcarrier frequencies to respective roles in the first numerology.

2. The method of claim 1, wherein the numerology is the first numerology when the channel bandwidth is equal to a pre-determined value, and the numerology is the second numerology when the channel bandwidth is not equal to the pre-determined value.

3. The method of claim 2, wherein the pre-determined value is 20 MHz.

4. The method of claim 1, wherein the numerology is the first numerology when the channel bandwidth is equal to a pre-determined value and the frame is an Orthogonal Frequency Division Multiple Access (OFDMA) frame, and the numerology is the second numerology when the channel bandwidth is not equal to the pre-determined value and the frame is an Orthogonal Frequency Division Multiple Access (OFDMA) frame.

5. The method of claim 4, wherein the first numerology includes a numerology repeated across a plurality of subchannels of the frame, and
   wherein each of the subchannels has a bandwidth equal to the predetermined value.

6. The method of claim 1, wherein the numerology is the first numerology when the channel bandwidth is equal to a pre-determined value, the frame is an Orthogonal Frequency Division Multiple Access (OFDMA) frame, and the frame is to be transmitted to a receiving device having an operational channel bandwidth less than the channel bandwidth of the frame, and the numerology is the second numerology when the channel bandwidth is not equal to the pre-determined value, the frame is an Orthogonal Frequency Division Multiple Access (OFDMA) frame, and the frame is to be transmitted to a receiving device having an operational channel bandwidth equal to the channel bandwidth of the frame.

7. The method of claim 1, wherein the indication according to the numerology includes an indication of a numerology scheme including the numerology.

8. The method of claim 1, wherein determining the channel bandwidth of the frame includes determining the channel bandwidth of the frame according to one or more selected from the group consisting of an amount of information in the frame, a cardinality of a plurality of receiving stations of the frame, and capabilities of the receiving stations of the frame.

9. A method for receiving a frame using a wireless device, the method comprising:
   receiving a preamble of the frame;
   determining a numerology of the frame using the preamble, wherein the numerology includes selecting the numerology from among a first numerology and a second numerology; and
   receiving a remaining portion the frame using the numerology,
   wherein each of the first numerology and the second numerology corresponds to mappings of subcarrier frequencies to respective roles, including:
      at least one mapping of a first subcarrier frequency to a guard band role,
      at least one mapping of a second subcarrier frequency to a DC subcarrier role, and
      at least one mapping of a plurality of contiguous subcarrier frequencies to a subband role,
   wherein the first numerology is different from the second numerology, and
   wherein when the numerology is determined to be the second numerology;
      the channel bandwidth of the frame includes a first 20 MHz bandwidth and a second 20 MHz bandwidth,
      the mappings of subcarrier frequencies to respective roles in the first 20 MHz bandwidth by the second numerology does not correspond to the mappings of subcarrier frequencies to respective roles in the first numerology, and
      the mappings of subcarrier frequencies to respective roles in the second 20 MHz bandwidth by the second numerology does not correspond to the mappings of subcarrier frequencies to respective roles in the first numerology.

10. The method of claim 9, wherein the preamble includes an indication corresponding to a numerology or a numerology scheme.

11. The method of claim 10, further including:
   determining a channel bandwidth of the frame,
   wherein determining the numerology includes determining the numerology according to the channel bandwidth.

12. The method of claim 11, wherein the indication corresponds to a numerology scheme,
   wherein the numerology scheme includes a plurality of numerologies, and
   wherein determining the numerology includes selecting as the numerology a numerology corresponding to the channel bandwidth from among the plurality of numerologies.

* * * * *